United States Patent [19]
Willhoit, Jr.

[11] Patent Number: 5,671,136
[45] Date of Patent: Sep. 23, 1997

[54] PROCESS FOR SEISMIC IMAGING MEASUREMENT AND EVALUATION OF THREE-DIMENSIONAL SUBTERRANEAN COMMON-IMPEDANCE OBJECTS

[76] Inventor: Louis E. Willhoit, Jr., 30 Papworth Ave., Metairie, La. 70005

[21] Appl. No.: 570,294

[22] Filed: Dec. 11, 1995

[51] Int. Cl.⁶ .................................................. G06F 19/00
[52] U.S. Cl. ..................................................... 364/421
[58] Field of Search ................................. 364/421, 422; 395/929; 367/71, 72

[56] References Cited

U.S. PATENT DOCUMENTS

| | | |
|---|---|---|
| 4,817,062 | 3/1989 | De Buyl et al. . |
| 5,321,612 | 6/1994 | Stewart . |
| 5,586,082 | 12/1996 | Anderson et al. . |

OTHER PUBLICATIONS

Argiro, "Seeing in Volume," *Pixel: The Magazine of Scientific Visualization*, pp. 35–39 (1990).
Bahorich et al., *The Leading Edge*, 14:1053–1058 (1995).
Brown, Interpretation of Three–Dimensional Seismic Data: Am. Assn. of Pet. Geologists Memoir 42, 2d Ed. 1988.
Clark, *Geophysics*, 57:894–901 (1992).
Dobrin, Introduction to Geophysical Prospecting: McGraw–Hill (1960), pp. v–ix.
Dorn et al., *The Leading Edge*, 14:1045–1049 (1995).
Faust, *Geophysics*, 18:271–287 (1953).
Frankel, *Communications of the Association for Computing Machinery*, pp. 426–435 (Apr. 1989).
Foster et al., *Geophysics*, 386–395 (1992).
Gardner et al., *Geophysics*, 39:770–80 (1974).
Loewenthal et al., *Geophysical Prospecting*, 24:380–99 (1976).
Nestvold, *The Leading Edge*, 11:12–19 (1992).
Oldenburg et al., *Geophysics*, 48:1318–37 (1983).
Petro Systems World (Computer Information for the Oil and Gas Professional)–Buyer Guide: Hart Publication, Denver (Autumn, 1995) cover & p. 2.
Rankin et al., *Am. J. of Roentgenology*, 161:695–701 (1993).
Sample et al., Diagnostic Ultrasound: G.K. Hall Medical Publishers, Boston (1980).

(List continued on next page.)

*Primary Examiner*—Donald E. McElheny, Jr.
*Attorney, Agent, or Firm*—Pravel, Hewitt, Kimball & Krieger

[57] ABSTRACT

A diagnostic seismic process for generating, recognizing, and remotely examining subterranean three-dimensional objects or sub-volumes uses processed seismic reflection data to produce high-resolution quantitatively measurable, three-dimensional images of buried objects. Examples of such objects are hydrocarbon reservoirs and their encasing rocks; fresh water aquifers; hazardous waste contaminants zones; potential drilling and mining hazards; unexploded military ordnance; caves; tunnels; historical and archeological artifacts and the like. The present invention examines the interior portions of underground sub-volumes called common-impedance objects imbedded in a relatively transparent background of seismic impedance sample voxels. Acquire available data sets for the area of interest (wellpaths, log curves, time-depth charts, etc.) and acquire an appropriate three-dimensional reflection seismic data volume. The data are then subjected to diagnostic three-dimensional processing to produce a vertically and laterally high-resolution matrix of relative-logarithm-of-pseudo-acoustic-impedance samples. A starting volume element is detected and identified as a starting voxel for a subterranean common-impedance object. A specified range of impedance amplitude criteria that determine whether an adjacent element is or is not to be annexed onto a particular element is then assigned. The three-dimensional spatial attributes are quantitative measures of a volume which is consistent with these criteria. The spatial attributes may include position, orientation, shape or configuration, internal impedance distribution, and volumetric dimensions of such a common-impedance object.

16 Claims, 6 Drawing Sheets

OTHER PUBLICATIONS

Stone, Designing Seismic Surveys in Two and Three Dimensions: Society of Exploration geophysicists References Series, vol. 5 (1994), pp. iii–ix.

Willhoit, 1989, The Value of Geophysics to the Oil Industry (1974–present); Geophysics: The Leading Edge of Exploration, Dec., 69–71.

Willhoit, 1992, Acquisition of a Low–cost, Environmentally–sensitive Marsh 3D Survey, Using an "All–boat" Land Design: Presented at the 62nd Ann. Internat. Mtg., Soc. Expl.. Geophys., Expanded Abstracts.

Wylie et al., *Geophysics,* 23:459–493 (1958).

Yilmaz, Seismic Data Processing: Society of Exploration Geophysicists Investigations in Geophysics Series, vol. 2, (1987), pp. v–ix.

PROCESS FOR SEISMIC IMAGING MEASUREMENT AND EVALUATION OF THREE-DIMENSIONAL SUBTERRANEAN COMMON-IMPEDANCE OBJECTS

FIELD OF THE INVENTION

This invention relates generally to the field of seismic data interpretation. More particularly, it relates to an improved diagnostic process for examining the earth's subsurface.

BACKGROUND OF THE INVENTION

Processing Theories and Geology

Prior art seismic processing and interpretation has been focused primarily on improving the efficiency of locating and/or economically producing petroleum fluids: crude oil and natural gas. Because petroleum fluids are lighter or less dense than mineral-laden subterranean waters, the two most widely accepted and economically successful theories for identifying trapped accumulations of petroleum fluids have been the anticlinal theory and the bright spot theory.

The anticlinal theory has been used to identify potential traps or subterranean regions in which recoverable natural gas and/or petroleum liquids might accumulate. The anticlinal theory is based on the concept that lighter-than-water petroleum fluids are generated in hydrocarbon source-rock layers, deeper than some threshold depth and warmer than some threshold temperature. The fluids then move by buoyant forces to the highest elevation in a porous and permeable reservoir layer (such as sandstone). From there the fluids either seep out to the earth's surface or are blocked from further movement. When blocked, the fluids are trapped by an impermeable layer either at the crest of a three-dimensional structural arch or adjacent to a fault surface along which slipping of strata has occurred, due to forces within the earth's crust.

The bright spot theory has been used to attempt to directly identify hydrocarbons (usually natural gas) ahead of the drill bit, regardless of the formation mechanism of the trap. It is based on the concept that the lower acoustic velocity and density of a gas in a reservoir produces a stronger seismic reflection amplitude than denser oil or water in the same reservoir.

Interpreters of seismic data and subsurface well-log data simplified the geological and geophysical concepts of complex petroleum reservoirs to clearly evaluate and recommend drill sites. The most common simplification was to separate the analysis of a reservoir into a structural component and a stratigraphic component. The structural component normally used a subterranean topographic map showing iso-contour lines of reservoir elevations or travel times. The stratigraphic component was usually in the form of a map depicting some property of a layer underlying the structurally-mapped surface. Example types of such a property were seismic-travel-time thickness or depth-logged thickness, seismic reflection amplitude, logged porosity, sampled or logged rock type, etc.

Formation "tops" picked by geologists and reflection seismic data interpreted by geophysicists were used with great success for the structural analysis. This has been because petroleum reservoirs, indeed, had some characteristics of uniform sheets of porous rock. Hydrocarbons were often found trapped buoyantly in the highest elevations of the reservoir, with gas above oil above water. Direct seismic evidence for the presence of natural gas, structurally trapped in younger reservoirs, was sometimes provided by locally strong reflection amplitudes on a seismic event interpreted to be an echo from the top/or base of the reservoir. For this reason, the seismic amplitude of a suspected reservoir horizon was a commonly mapped property of this surface.

An additional simplification was that "oil-water contact", "gas-oil contact", and "gas-water contact" surfaces were horizontal or flat due to the observed above-ground laws of buoyancy. Maps showing the two-dimensional outline of anomalous flat spots were also used when these anomalies could be interpreted, and especially when they coincided with bright spots or closed-contour structural configurations. Many wells were drilled successfully using these historically valuable techniques.

Other than the above bright spot and flat spot techniques, traditionally-processed seismic data has, so far as is known, been unable to contribute consistently to drilling risk reduction using seismic-stratigraphic analysis of prospective reservoir targets. This generally disappointing use of such reflection seismic information to identify and evaluate stratigraphically-trapped reservoir targets has been studied and documented. The accepted results of this body of work has included the following empirical observations:

(1) The earth's sedimentary surface layers absorb and scatter the higher frequency oscillations from any acoustic source. The layers make it increasingly difficult as depth increases to image isolated thin reservoirs, much less their complex, often gradational boundaries from porous to non-porous layers.

(2) Many valuable, deeply-buried petroleum reservoirs are made up of numerous thin laminations of porous, permeable reservoir layers, which are sandwiched between thin, impermeable non-reservoir layers. These targets require the presence of high and low frequencies (or, as sometimes termed, "broadband data") to create images useful for the reduction of drilling and well-completion risks.

(3) Seismic recordings contain not only the desired primary reflection events, but also contain unwanted acoustic noise, such as both multiple reflections and refracted-, surface- and converted-wave motions. There is also the ever-present electrical background disturbances from generators, commercial power lines, spark plugs, lightning strikes, etc. Identification of noise was most often based on the lack of lateral continuity of seismic events, using the assumption that desired signal reflections should look like continuous, possibly faulted, subterranean surfaces or layer boundaries.

(4) The broad-frequency-band of many of the sources of noise results in the noise overpowering the weaker, high-frequency reflection signal that is both attenuated by the earth and is also weakened geometrically by the spherical spreading of any point source physical wave. The seismic signal-to-noise ratio was concluded to be fundamentally limited by the recorded non-primary-reflection seismic noise, with the upper frequency limit of the usable signal decreasing as the depth to the target reflector increased. The term usable was understood as meaning actually usable to create faulted, but otherwise smooth, topographic contour maps of subterranean surfaces.

For these reasons, with the infrequent exception of gas-caused bright spots in young reservoirs, most stratigraphic prospect maps were created by geologists, using information from outcrops and borehole logs. Stratigraphic traps were most often sought by proposing a drill site on a contoured arch halfway between an abandoned drill hole with a log that indicated the presence of a porous-but-water-bearing reservoir and a drilled hole with a well-log indicating the same interpreted reservoir at a higher structural elevation. The water-bearing reservoir was at a low elevation, preferably with a trace of hydrocarbons called a "show" on log measurements or in drill cuttings but non-porous at the updip location.

Geophysics of Compressional Sound Waves

The earth's sedimentary crust is understood by petroleum industry geoscientists to be a complex layered acoustic medium that is neither homogeneous nor isotropic. In order to assist in making predictions about its valuable but optically invisible contents, researchers have used models. There has been a wide range of seismic earth models, from the simplest acoustic approximations to more sophisticated asymptotic elastic models (e.g., shear, compressional and converted waves, but no absorption or dispersion), to full visco-elastic modeling, using both computers and physical modeling tanks.

This large body of work has resulted in many published theoretical and empirical relationships between the speeds of sound waves, the bulk moduli, shear moduli, and densities of different dry and fluid-saturated materials. These have been published along with data on the influence of other parameters (e.g., age, cementation, temperature, confining pressure, porosity, fluid-type and saturation, etc.) on rock and fluid velocities and densities. The geophysical and particularly seismic understanding of the earth, based to a large extent on research using simplified earth models, is quite comprehensive and still continuing today.

In the field of petroleum geology and geophysics, three-dimensional reflection seismic surveys are typically recorded using 10–120 Hz sound waves generated by many individual near-surface sources positioned over a target area of the earth's surface. Separate digital recordings are then made by multiple receivers or geophones following each detonation or vibrator sweep. Based on a simple wave-front construction principle known as Huygens' principle, the successive positions of a wavefront propagating through a medium can be predicted by treating each point on the wavefront as if it were a point source for a new wavefront. A sophisticated computerized process has been developed to model the arrival times seen on recorded traces from each separate subterranean reflecting-surface.

This seismic modeling process is known as the exploding reflector model. The results of this single-reflector model are approximately equivalent to a model in which a planar compressional sound wave travels vertically downward, reflects from a single subterranean surface, and the upward traveling reflected motion is recorded by a uniform grid of geophones imbedded in a flat earth surface. In either case, the three-dimensional volume of numbers generated by the traditionally combined recordings represents a two-way travel time volume of reflectivity values but representing generally unknown subterranean reflection point positions.

Because there is no directional information in a single vertical-component seismic trace, multi-trace analysis allows the apparent two-way travel time dips of reflecting surfaces to indicate the direction from which the reflected sound wave came. Moreover, in areas with little dip to the strata, the speed of sound in the subsurface can be estimated directly from the seismic records by measuring normal moveout (NMO) of reflection echo two-way travel time as seen on sequential traces with increasing source-to-receiver separation.

One of the most powerful advantages of a three-dimensional seismic stacked volume over a two-dimensional stacked profile is that the volume theoretically allows accurate three-dimensional re-positioning (laterally and vertically) of each reflectivity sample. This re-positioning is called three-dimensional migration and is one of the recently rediscovered advances in 3D seismic technology.

Interpretation of vertical slices through a three-dimensional volume requires an understanding of two basic rock properties. One is the speed of sound, or velocity, and the other is bulk density. It is known that the speed of sound in any medium depends on the type of sound wave being considered (compressional waves, shear waves, surface waves, etc.) and the direction of the wave propagation with respect to the layering of the rock. It is also known that even subtle changes in bulk rock density cause seismic reflections, even if there is no associated change in velocity. This is because sound energy reflects from any and every change in a subsurface parameter called the acoustic impedance. Conservation of momentum and energy across a rock interface dictates that the magnitudes of the reflected, transmitted and converted wave energy are governed among other things by the change in acoustic impedance. Other factors include: the change in the shear moduli of both the media above and below the layer, or outside and inside the body and the angle at which the incident wave strikes the interface. If the incident angle is 90 degrees (vertical wave propagation, horizontally dipping layers), only the change in acoustic impedance is important.

The definition of acoustic impedance, I, is that it is the mathematical product of a rock's acoustic velocity and its bulk density, with units of Rayls, where 1 Rayl=1,000,000 kilograms per second per square meter. In more common geophysical units, 1 Rayl=3280.833 feet per second-grams per cubic centimeter. Acoustic impedance varies over the three spatial dimensions. It is convenient in the industry to define seismic travel time as the two-way compressional wave travel-time calculated from the true depth, z, using the known or estimated velocity of sound that varies over x, y, and z. Acoustic impedance (with units of "momentum density") has always been an elusive quantity because the concept of velocity is, mathematically, a vector with a magnitude (speed) that depends on the wave type and propagation direction within a generally dipping layered earth.

For evident reasons, depth-to-time and time-to-depth conversions are critical geophysical concepts. It is an axiom that knowledge of subsurface velocities is needed to convert from a physical (usually, drilled) depth dimension to a quasi-physical, multi-directional, seismic-travel-time dimension, and back again once a seismic time map has been created. This conversion concept is very important in both the processing and interpretation of seismic reflection data. The three-dimensional variability and mathematical complexity of most real seismic-travel-time-to-depth relationships has led to serious problems for interpreters during creation of contour maps showing the depth to a prospective reservoir.

The "bulk density log" ($\rho$, in grams per cubic centimeter) and the "interval transit-time log" (in micro-seconds per foot) are both collected using downhole wireline recording tools in a usually fluid-filled hole. They show readings taken typically every six inches inside a drilled well bore. A rock's compressional wave acoustic velocity (V, in feet per second) can be obtained by simply dividing 1,000,000 by the interval transit-time value. Even though geoscientists in the petroleum industry have long been aware of the importance of both rock transit time (1/speed-of-sound) and bulk density information to seismic reflection theory, many operators have routinely chosen not to log one or both of these key acoustic properties, over large depth intervals.

The most common logging suite included an SP (spontaneous potential) voltage tool, to identify fluid-filled porous reservoirs, and an electrical resistivity measuring (applied voltage/current generated) tool, to indicate the type of fluid in an SP identified reservoir. Wet reservoirs are usually filled with more conductive water (brine) while petroleum-filled reservoirs measure orders of magnitude more resistive. Radioactive-source, gamma-ray-measuring density logs measured atomic electron density by recording the intensity of back-scattered gamma rays. These logs were expensive to run, strictly regulated to avoid underground loss of the radioactive logging tool, and generally reserved for porosity calculations (assumed proportional to density, in an uniform rock matrix) over zones with anomalously high fluid resistivities. Acoustic transit time logs, likewise, were frequently run only over the short depth intervals where pay or production was suggested by the SP and resistivity log suite.

A rock's acoustic impedance (I) is the mathematical product its density, $\rho$, multiplied by its velocity, V, and can be calculated at every logging depth down a borehole from these two types of well logs. At any point in three-dimensional subsurface space, the local density multiplied by local velocity equals the local acoustic impedance, or $$I=\rho*V$$

The compressional acoustic wave Reflection Coefficient or "reflectivity" ($R_{12}$) of the surface between Layer 1 and Layer 2 (where the wave travels from Layer 1 into Layer 2), with respective quantities of acoustic impedance $I_1$ and $I_2$, is also a three-dimensionally varying quantity for all surfaces separating subterranean "strata." This quantity is defined as being equal to the difference or change in the acoustic impedance values, divided by the sum of the acoustic impedance values, or:

$$R_{12}=(I_2-I_1)/(I_2+I_1).$$

Two- or three-dimensional, compressional-wave reflection seismograms are a collection of traces that show most importantly the arrival time of compressional sound wave echoes, or reflections. By far the most sought-after reflected echoes recorded by seismic traces in the past were produced by an acoustic source placed on or near the surface the ground. The energy travelled downward and was then reflected from the change in acoustic impedance at each boundary surface, sometimes a petroleum reservoir. If the sound source and listening device are essentially at the same surface location, a compressional wave pulse echoes back from an imaginary rock boundary (between Layer 1, above, and Layer 2, below), with an amplitude that is some fraction, $R_{12}$, of the original pre-reflection pulse amplitude. If $R_{12}$ is positive, the reflected pulse has essentially the same shape (polarity) as, but weaker in amplitude than, the original pulse. If $R_{12}$ is negative, the reflected pulse again has the same "shape" but is now said to be of negative polarity, meaning that "compressional" particle motion reflects back as "rarefaction" particle motion.

To further clarify these important points, consider the simplest case of a single, flat-lying reflecting surface or reflector in a two-layer simplified example of the earth, with a very thick low-acoustic-impedance ($I_1$) layer, overlaying a very thick high-impedance ($I_2 > I_1$) layer. This is a positive reflector in that a reflection would return unchanged in its sense of compression or rarefaction. A generated acoustic pulse is normally compressional, and initially causes the motion of the earth's particles to move away from the blast site in the direction of propagation. After a time known as the reflection's two-way travel-time, the pulse has traveled down to and reflected back from the single reflector. Upon its arrival back at the earth's surface, the pulse causes the earth surface to move. Upon sensing this ground motion, a geophone planted near the source location emits a positive voltage pulse due to the ground's upward first-motion forced by the upward-traveling compressional wave. In this simple case, the first motion is seen by an observer as a "kick" to the right on a vertically displayed trace, or an upward-deflected "peak" on a horizontally displayed voltage chart trace. If this example is altered to make $I_1>I_2$ by placing a soft, slow layer of coal under a dense and fast layer of limestone, for example, a negative reflector results. This negative reflector would cause the geophone's first motion to produce a "kick to the left" on a vertically displayed trace or appear, on a horizontally displayed trace, as a downward-deflected "trough."

Accurate seismic maps of the tops and bottoms of petroleum reservoirs would be easy to construct if (1) there were only one thick reservoir beneath the area of interest, (2) it had a constant acoustic impedance distribution, and (3) it was encased in rocks with a different constant acoustic impedance than the reservoir. But, in the real subterranean earth, many, many echoes are produced by a shot, and much reflection and other energy is recorded, coming generally from all directions, with the compressional sound waves reflecting from all of the actual changes in acoustic impedance present.

Within the traditional concepts of petroleum industry geophysics, digital seismic voltage samples were believed to contain noisy information about the earth's layered reflectivity and were usually arranged and displayed vertically as traces running down into the earth, but measured on a vertical two-way travel axis, making them form a seismic cross-section. A common interpretation technique was to display these digitally-sampled traces side-by-side so that their peaks (positive numbers) and troughs (negative numbers) overlapped. The geographical position of each shot point and receiver station was more or less known and, along with the unwanted noise, each trace contained a signal component that could be interpreted to yield both the two-way-travel-times and estimates of band-limited reflectivities for points on subterranean layered surfaces.

Snell's Law of reflection dictated that these reflection points would be scattered about on arbitrarily dipping layer boundaries throughout the subsurface. However, in order to contour maps and recommend drill sites based on the subsurface elevations of a reservoir layer, interpreters assumed that each reflection point was beneath a straight line connecting the shot point station and the receiver station, and situated exactly halfway between them (the midpoint). A collection of single-shot-into-a-single-receiver-station traces was called a single-fold seismic profile. The (x, y) or (latitude, longitude) coordinates of the various midpoints defined the surface track of a seismic line on a map. To make these overlapping-trace profiles look more like geologic cross-sections, the area under each peak was shaded black, so that a single trace's reflection wiggle or event was interpreted to be a single reflection point on a two-dimensional reflection surface or horizon.

The processing of two-dimensional (and later, three-dimensional) seismic profiles and volumes to accentuate the overlapping peak and trough continuity was desirable to interpreting geophysicists, whose assignment it was to create smooth time or depth (and other attribute) contour maps on the tops of geologically identified formations. Reflection continuity was the accepted goal of highly-specialized processing geophysicists who, in many instances, had been given only a brief diagrammatic description of the real earth's complex geology. Tens of thousands of prospects were mapped and drilled based on structure and amplitude maps from grids of two-dimensional seismic lines.

Elaborate and sophisticated, digital computer seismic processing software was developed over the years to permit the mapping of the surfaces of thinner reservoirs, more subtle fault surfaces, and the tricky problem of converting misleading seismic cross-sections to true-structure geologic cross-sections. The seismic data showed layered surfaces in milliseconds of travel-time, while the geologic cross-sections showed layered surfaces in feet or meters of depth. Processing techniques were designed and used extensively to perform such useful-for-surface-mapping functions as:

Weighted trace mixing, or summing weighted samples on adjacent traces;

CMP stacking, or summing time shifted samples to form a common midpoint trace;

Coherency filtering in both the time and frequency domains to enhance lateral reflection continuity; and Dip move-out (DMO, or partial pre-stack migration) correction filtering, to enhance the visibility and continuity of normally-stack-attenuated diffracted energy and advertised to enhance the lateral positioning of subsurface reflection points.

These were effective tools for increasing the reflection continuity of the two-way travel time to layered subterranean surfaces using two-dimensional and three-dimensional seismic profiles. In addition to the processing tools developed to smooth seismic reflection surfaces, offshore data acquisition methods contributed substantially to the belief that smooth surfaces exist in the subsurface, and that data acquired on land suffered from many sources of "noise" absent in the marine environment. Interpreters were taught that marine data were inherently superior in data quality to land data because continuous, subterranean-surface reflections were more commonly recorded offshore.

Prior Art Processing Techniques

The prior art has seen various schemes and processes for utilizing relatively narrow frequency-bandwidth, two-dimensional and three-dimensional reflection seismic data to identify and map the structure, including the placement and magnitude of faults. Also, but less commonly, attempts were made to identify the seismic reflection amplitude of an interpreted subterranean reflection surface or horizon, imagined to form the boundary between layers with different quantities of acoustic impedance.

In U.S. Pat. No. 5,153,858 and No. 5,251,184, both to H. A. Hildebrand, a method and apparatus for finding horizons or surfaces in three-dimensional seismic data is disclosed. They involve a variation of a technique for generating horizon structure or amplitude maps from a three dimensional volume of seismic traces. These are consistent with the above discussed anticlinal theory of petroleum accumulation, in which contoured structure maps are the primary tools for selecting drill sites.

U.S. Pat. No. 5,018,112 is for a method for hydrocarbon reservoir identification based on defining areal boundaries of a hydrocarbon or petroleum fluids reservoir. This was done using traditionally-processed three-dimensional seismic traces in combination with distinctive critical parameter information from a producing well in the area. It is apparently assumed that traditional seismic processing is acceptable. One seeks according to this patent to locate surface-of-the-earth areas at which a drill site might be chosen to find producible hydrocarbons analogous to the key well from which the distinctive critical parameter was derived.

U.S. Pat. No. 5,383,114 is a method for interpreting a three-dimensional reflection seismic data volume by displaying the color-coded data as two-dimensional cross-sections, whether vertical or horizontal slices, for the purpose of showing the structural dip and strike of subterranean reflection surfaces. These surfaces were imagined to separate layers with different quantities of acoustic impedance.

There have been recent discussions in the literature of the use of three-dimensional volume visualization as the combination of processes and rendering techniques to display complex data in an easy-to-understand fashion. Emphasis is again on interpreted horizon surfaces, their relation to interpreted fault surfaces, and the various time-structural and amplitude attributes of a reservoir horizon surface that can reveal both the fault pattern breaking the horizon and its seismic stratigraphy. Another recent method of processing seismic data is by imaging discontinuities, e.g., faults and stratigraphic features. A coherence cube is developed, which is a three-dimensional volume, or cube, within which faults are revealed as numerically separated surfaces. In both of these instances the traditional assumption is made that the earth's subterranean features are best described by layered surfaces, and relatively narrow-band, low-frequency processing (<45 Hz dominant at 1.0 second in examples published) is used to generate the three-dimensional data volumes.

SUMMARY OF THE INVENTION

Briefly, the present invention provides a new and improved process for examining the earth's subsurface and interpreting separate and distinct subterranean objects of interest using diagnostic three-dimensional processing of seismic impedance volumes. According to the process, information about the subsurface beneath a target surface area of investigation is acquired along with a 3D reflection seismic survey across the target surface area of interest.

The acquired seismic data are then computer processed to produce a well-processed volume of seismic reflectivity samples. This processing is typically guided by well log data. The volume of seismic reflectivity samples is then convened into a volume of relative acoustic impedance samples.

The assembled data and impedance samples are then furnished as a volume visualization computer database project, furnished as input data to a high-speed volume-rendering workstation. Each impedance sample is treated as a voxel, or individual volume element, with a calculable estimated volume. A specific starting point is then selected in the database to act as a starting point for an iterative detection or comparison process, which leads to a detected common-impedance object or feature of interest. A resulting feature of interest so formed includes a number of contiguous individual volume elements that have impedance amplitude values within a given range of acceptable parameters.

Initially, contiguous elements are analyzed to decide if any of the adjacent elements should be regarded as part of the feature. If so, they are added or assembled to a common volumetric model of acceptable parameter characteristics. If not, the element is rejected.

The detection process continues for individual elements adjacent those assembled during a comparison cycle and is repeated until detection parameters result in a resultant volumetric model composed of volume elements of commonly acceptable parameters. The quantitative position, orientation, shape and configuration of the detected model is then stored. If desired, the parameters may be adjusted and the process repeated. An output display of the assembled volumetric model is then formed as an image of the subsurface feature of interest.

The present invention thus provides a process for recognizing and examining subterranean objects or features of interest based on measured, processed reflection seismic data which are processed in a computer into a form representative of impedance samples of the subsurface features.

The process taught in this invention uses the complexities of the earth, well-processed reflection seismic data, and computerized volume visualization techniques in a manner contrary to a number of conventional processing assumptions discussed above. Such assumptions included treating the top or base of a three-dimensional volumetric reservoirs as a seismically mappable surface, lying between layers of different acoustic impedance. However, it is now known that the actual acoustic impedance characteristics of reservoirs, fluids, and the surrounding material are more like fuzzy object with: gradational boundaries, complicated internal composition, all imbedded in a three-dimensional complex of non-reservoir rock deposits. Unlike outcrop colors and weathering patterns, smooth and continuous subterranean acoustic impedance layer boundaries are actually the exception rather than the rule.

With the present invention, subsurface objects such as possible petroleum reservoirs can be more effectively recognized and measured. The computerized processing sequence of the present invention purposely does not routinely result in seismic images of smooth subterranean surfaces, broken only by clearly identifiable fault surfaces. In fact, it avoids the use of complex processing algorithms routinely used in the past to create the smooth overlapping of peaks and troughs on adjacent seismic traces.

DETAILED DESCRIPTION OF THE INVENTION

Basic Processing Sequence

Figure 1:
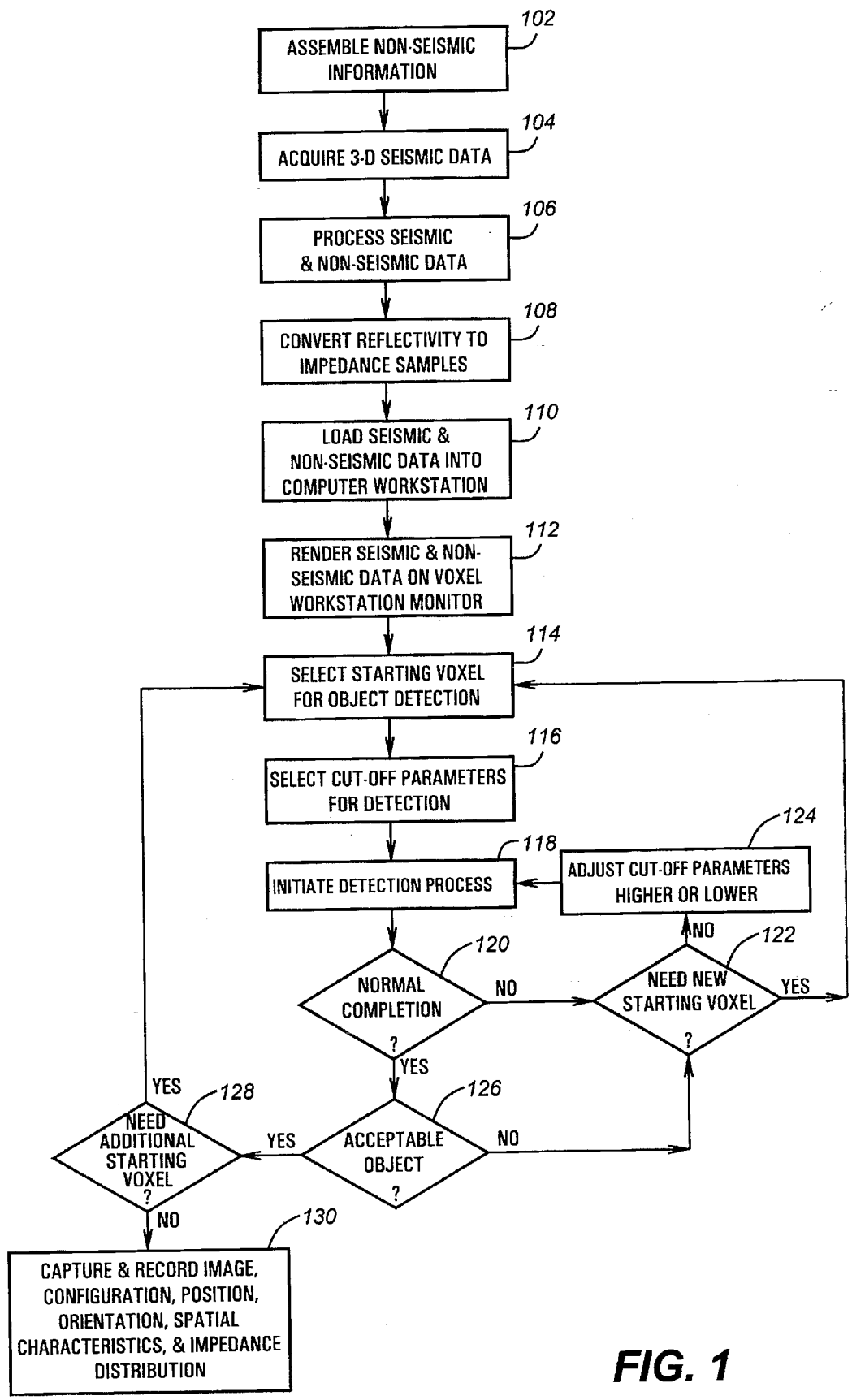
FIG. 1 is a schematic diagram of the process steps according to the present invention.

In the drawings, a diagnostic three-dimensional seismic process (FIG. 1) according to the present invention to investigate the subsurface features beneath a chosen area of interest, is shown. The process begins with an initial step 102 which is to assemble as much non-seismic information about the area of interest as possible.

There are typically three major categories of such non-seismic information and data used in the seismic process of the present invention. The first category includes digital geographic polygonal data (two-dimensional line segments). These take the form of latitude and longitude (or state plane X and Y) coordinates of the endpoints of line segments that represent surface features, both cultural (e.g., political and land use boundaries, railroads, highways, etc.) and natural (e.g., water body shorelines, elevation contours, vegetation zones, etc.). These lines can be digitized from governmental topographic contour maps and other specialized maps such as mineral rights ownership, oil & gas leases, mining excavation specifications, etc.

The next category of non-seismic data takes the form of digital three-dimensional subsurface data (line segments and value-versus-depth). Examples of this type data include latitude, longitude, elevation (or x,y,z) coordinates of a variety of subsurface entities, including: objects found during excavation operations; drilled borehole paths; geologically interpreted formation (or object) boundaries encountered in boreholes; digital data points (log curves) measured in a wellbore by wireline logging tools; and historical and economic data associated with buried objects (such as operation dates, reservoir pressures, initial production rates, well casing points, etc.). Boundaries, specifications and subsurface data results of other non-three-dimensional seismic surveys (e.g., gravity, magnetic, magnetotelluric, induced polarization, electro-magnetic, radar imagery, etc.) are also useful.

Acoustic impedance data for rocks and target objects is the third category of such non-seismic data. The present invention uses seismic compressional wave reflections, produced by changes in acoustic impedance, for its high resolution imaging of common-impedance objects into assembled volumetric models of subsurface features of interest. It is important to assemble a complete database of bulk densities (e.g., grams per cubic centimeter) and compressional wave velocities (e.g., feet per second) for all expected components of the subsurface area of interest. For homogeneous materials, the acoustic impedance of a material at a specific location is defined as the mathematical product of its local bulk density and local sound velocity at this location. For heterogeneous materials such as the earth's subsurface, the seismic process of the present invention uses the sound velocity perpendicular to micro-layering (i.e., near vertical for gentle dipping strata) as a good approximation of the local sound velocity. It is important that an approximate acoustic impedance value be known for any objects of potential interest as well as the continuum of background objects.

One source for material (rocks, fluids, etc.) density data and for compressional wave acoustic velocity data is the data obtain from borehole wireline density log curves. These give an in situ measurement of subsurface bulk (electron) densities by means of scattered gamma rays using a suspended radioactive source. Another source of data is published laboratory measurements of material densities. Care should be taken in the transfer of laboratory data to subsurface formations by taking into account that a material's bulk density depends on its depth of burial, porosity, percent impurities, fluid saturation, and the like.

Velocity data can be obtained, for example, from borehole velocity surveys of the type collected by petroleum industry well operators in order to produce a chart of two way seismic travel time versus depth. They have been used to estimate the depths to time-contour-mapped reflection surfaces. These surveys provide a coarsely sampled average speed-of-sound in rock as a function of depth. Typical intervals are between 50 and 500 feet. At times, adjustments must be made due to the effects of averaging over layer intervals. Another source of velocity data is borehole wireline acoustic travel time log curves. These are in situ measurements typically taken every six inches down a seldom-straight/ seldom-vertical well bore. Care must be taken in some instances in the use of these log curves. Long-source-to-receiver-spaced transit time ($\Delta t$) well log curves give deep readings, in microseconds per foot, many inches away from the borehole, but are susceptible to unusable data problems over zones containing acoustically slow natural gas.

The velocity of sound in a gas depends on its confining pressure and temperature but is typically less than 2,000 feet per second. Sound travels in most non-gas-saturated waters at approximately 5,000 feet per second, while sediment and rock compressional velocities depend on many factors (porosity, cementation, grain size and orientation, etc.) but are typically in the range of 6–20,000 ft/sec. The speed of a compressional sound wave also depends on its direction of propagation, especially with respect to the microscopic orientation of the fine, plate-like particles that constitute most muds and shales, after the mud is compressed. These real effects of sedimentary micro-layering are generally more gradual than other interesting causes of sudden change in acoustic impedance in the earth.

Still another velocity data source is available from published laboratory measurements of speeds-of-sound in various substances. These types of data are available from the same source materials as those for laboratory density measurements mentioned above.

The accuracy and precision of the non-seismic data assembled of course affects the resolution and interpretability of the final seismic volume. It is highly recommended that the computer database be populated and quality checked for self-consistency before acquiring and, especially, before processing or reprocessing the seismic data set.

The next step in the process according to the present invention is step 104, that of acquiring a positionally accurate three-dimensional seismic data set. This is done by assuring that the (x,y,z) coordinate of each sound-emitting source point (e.g., surface "shot point" position and dynamite burial depth) and of each receiver station is accurately and precisely known. The ability to produce crisp, well-defined or focused subterranean images with the present invention requires accurate locations for each acoustic energy source point and each transducer or receiver point.

Data obtained from linear or areal arrays are not generally suitable for the present invention, due to the smooth or averaging effect performed as a result of this acquisition technique. There are a very large number of field designs that can, however, result in high-resolution images of subterranean common-impedance objects after processing. It is preferable to survey the three-dimensional position of each source and receiver station using the Differential Global Positioning System (DGPS), or equivalent devices providing sub-meter accuracy. Also, at times circumstances require discarding any source or receiver stations for some reason cannot be set on the regular surface grid pattern. These are often called "offset" shots or receivers.

In this situation, it is preferable that the stations be moved in an in-line or cross-line direction a distance that is an integer multiple of the regular station spacing. This is done to minimize trace scatter within any common mid-point cell. The seismic sample at time T, for example, on a given common mid-point cell stacked trace is formed by adding (after calculated static and dynamic time shifts have been applied) all samples at the same time T from the N traces whose midpoints between source and receiver pairs are within the same or common midpoint user-defined area. Each N-fold stacked seismic trace is traditionally displayed at the (x,y) position of the center of its common midpoint cell, and acquiring traces whose midpoints do not fall close to a cell center should be avoided.

It is also preferable to use a commercial three-dimensional field design or theoretical modeling computer program to design and field monitor each common midpoint in the area of interest. This is done to insure that the midpoints have adequate traces falling within their respective cells with minimal scatter. Source-receiver distances should only be as wide as necessary to attenuate multiple-reflection energy, a source of seismic noise. As a quality control measure, it is desirable to sample each geophone's motion-caused-voltage fluctuations at a shorter time interval than required by traditional (i.e., contour map goal) data, with a minimum sample interval of two milliseconds and one millisecond (or less) desirable, depending on depth and required common-impedance object resolution.

It is also helpful during field acquisition to take into consideration certain other factors. For example, it is helpful in surveying to begin with a simple, orthogonal source-line/receiver-line layout, using constant source station spacing except for the "bricking" that is often desirable; constant source line spacing; constant receiver station spacing (receiver "bricking" adds risky processing complexity), and constant receiver line spacing. If the survey size permits, it can be useful for processing simplicity to have exactly the same live receiver stations for every source detonation. These are called static-receiver-spread shot records. A variation of this field design is to allow the data processors to perform efficient statistical analyses of changes in near surface rock or soil velocities, by deriving static time-shift corrections to a smooth pre-defined datum surface, which typically leads to better resolution of the subsequent elements or objects.

It is also helpful to acquire a grid of common midpoints or stacked traces, spaced at from two to eight times the desired final processed data migrated-trace spacing. Traditionally, optimum midpoint spacing was determined from (a) the cross-sectional area of the smallest valuable target expected, (b) the maximum dip desired to be imaged, (c) the acoustic velocity distribution of the subterranean rocks, and (d) the time sample interval. The process of the present invention usually does not require the acquired common midpoint stacked traces to be spaced so closely. Instead, it constructs the final migrated trace spacing using careful trace interpolation in processing.

Another feature of economic importance is to use low common midpoint multiplicity or "fold": between six and twenty traces per common midpoint, depending on depth to and reflectivity of targets. High fold or multiplicity contributes to the degradation of target resolution, assuming that seismic multiples have been properly handled with a combination of filtering (deconvolution, Radon transform, etc.) and stacking.

Seismic Data Processing

Step 106 is the next process step, processing the data assembled in steps 102 and 104. Details of this step are set forth in FIG. 2, which is a flowchart showing details of the seismic processing sequence according to the present invention. The seismic data processing of step 106 may be performed on any of a number of suitable, commercially available general purpose computer systems or work stations. A particularly suitable such computer system, for example, is the Omega interactive processing system from the Western Geophysical Company running on an RS6000 Model 590 platform from International Business Machines.

The result of such processing produces a three-dimensional grid or volume of seismic samples. Each of these samples represents a measure of the reflectivity, or an average change in the subsurface acoustic impedance across a small, imaginary, horizontal surface localized around a three-dimensional seismic space coordinate usually in (x, y) and two-way travel time dimensions. It is to be noted that the vertical two way travel time to any seismic sample is only an approximation to the truly vertical two way travel time to the small subterranean surface. This actual time would be theoretically obtainable by doubling the sum of all the finely sampled interval transit times measured in a truly vertical bore hole.

Step 202 (FIG. 2) is the first step performed in the routine of step 106 performed by the standard editing of the raw field recorded traces sorted and displayed as shot records or shot gathers. Inverted traces or the presence of positive peaks where negative troughs should appear usually can be identified and repaired at this time. Also, re-sampling to a coarser seismic time sampling interval, using a ¾ Nyquist anti-alias filter, could be performed, if desired, but it will usually result in degraded resolution. Since the Nyquist frequency is ½ the sampling frequency, or (½)*(1/sampling interval), an anti-alias high-cut filter of 93 Hz would be used for 2-to-4 ms resampling.

Concurrently with step 202, quality control step 204 is performed. It is preferably the first of at least five recommended quality control steps in the processing scheme of the present invention. During them, a user may verify accuracy of the data and parameters in question in the conventional manner. During step 204, this first look at each of the traces recorded following the initiation of each of the sources is important, not to edit traces but to gain a sense of the data quality. Shot records can be viewed either on paper or on a video monitor at horizontal and vertical scales that permit seeing an entire record in one glance. Because individual traces and even individual shot records (many hundreds of traces) are unimportant in the context of the millions of traces typically recorded in a modem 3D survey, it is best to delete traces or entire records if suspicions exist regarding its zero-time, gain, shot-receiver offset distance, and clearly non-geological noise.

Step 206 which follows step 202 is another standard static time correction operation in which the recording geometry of each trace (the x, y, and elevation values for the trace's source-receiver pair) is generated and put into digital words in each trace-header, if this has not been performed by sophisticated field instruments. Each trace-header also gets a pair of numbers (field static time shift values) that are based on the elevation of the source point (e.g., surface elevation minus the depth to the base of the charge) and the elevation of the receiver. These numbers represent the summed time shift which puts the trace samples at theoretical common times as if all sources and receivers were resting on a user-specified surface or datum plane, and if the velocity between the actual surface and the datum plane was a constant correction velocity. Preliminary shallow time mute functions are usually chosen here to remove unwanted, high amplitude, non-reflection energy such as ground roll, "first break" refracted arrivals and shallow surface waves.

The next step is step 208 which corrects for the natural decay in the source sound wave energy amplitude or strength. This energy is proportional to the square of the surface motion velocity, or the square of the geophone voltage amplitude, and weakens as the energy expands nearly spherically in three dimensions. This standard seismic processing step, known as the spherical divergence amplitude correction, multiplies later occurring voltage samples by larger numbers to amplify weaker echoes from deeper in the earth.

Step 210 is then performed to balance the root-mean-square (RMS) amplitudes, within a user-selected time window, of all traces in each individual shot record. This correction is based on an assumption that the RMS value of the earth's reflectivity beneath all points on the surface is random over the user-selected time or depth range (1–3 seconds=3–12,000 feet, for example). Further, the assumption is that its RMS value should be independent of the distance between the source and the receiver. This offset dependent trace scaling is an empirical correction to the theoretical spherical spreading correction according to step 208 above. It is the first of many residual corrections calculated from the data to both travel-times and amplitudes.

The next step 212 is similar to step 210, except that the processing corrects for variations in trace amplitude caused by either the physical coupling to the earth of each source and each receiver, or the local environment at each receiver and source station. Examples of physical coupling problems that would influence the amplitude of all signals being recorded from a source, or by a receiver, are: a geophone laying on its side (misplanted); a damaged (misfired) dynamite charge; or a shot hole drilled too shallow (not into the water table). Examples of environmental factors are: a thick, dry, weathered near-surface layer; the presence of near-surface caves (karst topography); or simply planting a geophone with its spike coupled to or touching a root or boulder.

All of these problems with individual sources or receivers increase or lower the amplitude of any associated trace, and therefore are corrected by means of surface consistent amplitude scaling, using a defined multiplier for every individual sample in the trace. Each trace has a source factor and a receiver factor, which step 212 derives and applies as a complete set of unique multipliers for each source and each receiver station.

Step 214 which follows involves what can be called time domain spectral balancing. Its purpose is to precondition each trace so that future processing steps can shape a signal entity called the "seismic wavelet" to provide maximum vertical (time) resolution. Such a signal entity is a representation of physical echoes reflecting from changes in subsurface acoustic impedance. Using what is known as a convolutional model, a recorded seismic trace is a time series that can be constructed mathematically by convolving a seismic wavelet with an earth function. The seismic wavelet is in the form of a short simple time series, either measured or assumed, while the earth function is a longer, more complicated time series of reflection coefficients.

The earth function can be built from known changes in acoustic impedance measured on density and transit time well logs or on data from a vertical seismic profile. The processing is done to shape the wavelet so that it has the broadest signal-frequency bandwidth and the shortest travel-time duration. This creation of a short, high-resolution wavelet out of a longer, lower frequency source wavelet is called spiking deconvolution, or decon, hereafter.

The preferred deconvolution uses one of many commercial decon filters or operators, any of which are good at shaping an input narrow-frequency-band time series seismic trace into a series of short, sharp spikes or broadband reflection coefficients. The optimum deconvolution results when the input trace contains a single, unchanging wavelet with time with its maximum amplitude nearest to its inception, which is known as the minimum phase assumption.

The time domain spectral balancing uses minimum phase (not zero phase) bandpass filters to decompose each input trace into at least ten overlapping, trapezoidal, equal-bandwidth sub-bands. In the frequency domain, for data recorded with a 6-93 Hz field filter, a possible decomposition could be based on the following thirteen minimum-phase bandpass filters (trapezoidal corners specified at amplitudes 0,1,1,0): 3-7-9-14; 9,14,16,21; 16,21,23,28; 23,28,30,35; 30,35,37,42; 37,42,44,49; 44,49,51,56; 51,56, 58,63; 58,63,65,70; 65,70,72,77; 72,77,79,84; 79,84,86,91; 86,91,93,125.

Following the above described spectral decomposition, the thirteen resulting traces should have their RMS amplitudes balanced in time with an automatic gain control (500-1000 ms AGC preferred) or a less expensive, equivalent normalization within overlapping time windows. The time balanced RMS amplitude are then balanced across the thirteen frequency bands by normalizing each trace so that its RMS amplitude equals the average RMS amplitude of all thirteen decomposed traces. Finally, these traces are preferably summed sample-by-sample, and reseated using the inverses of the AGC or gated normalization to recover the relative amplitude information technically lost in normalization. However, this is not an essential step if these inverses are unavailable. In this manner, reconstruction of a pre-conditioned time domain spectral balanced output trace is performed during step 214.

Processing then proceeds to step 216 which involves a surface-consistent spiking deconvolution. Step 216 uses the preconditioned traces, with their broadband wavelet, to identify and remove many types of energy that extend the duration of the seismic pulse. The undesirable energy is associated with the both the source location and the receiver location. Therefore, identification of this energy is done by defining a decon operator or digital filter at each surface station, and applying both the source decon operator and receiver decon operator to the trace. This is done in order to remove any near-surface reverberation from the downgoing and upcoming wavelet.

These resolution-lowering effects can come from many circumstances but the most common are reflection ghosts from the surface (for buried shots or receivers) and large near-surface changes in acoustic impedance (top of water table, base of permafrost, etc.). Step 216 converts each recorded trace into a broadband earth function, but not one that can be physically measured on any well logs. This is because the reflectivity spikes still originate from many directions and are not confined to vertical travel down any well path, prior to migration.

Multiples are another problem that the processing of step 216 helps to solve. It is important to emphasize that the process avoids the use of so-called dip-moveout (DMO) corrections by using lower common mid-point fold with closer shot-receiver separation. This helps to insure that reflection points which are actually areas called Fresnel zones do not drift updip as shots and receivers are separated. Multiply reflected wavefronts typically follow a longer travel path than singly reflected reflections, arriving at the same two-way time. Accordingly, there is a diagnostic delay time associated with multiples on the longer offset traces.

The recommended shot and receiver decon operators for step 216 are based on the Wiener-Levinson prediction algorithm using a prediction distance of one time sample and a decon filter length just long enough to span the preconditioned trace wavelet. This length is typically determined by the decon QC test plots during step 218. When derived from and applied to broadband time domain spectrally balanced traces, short spiking decon operators compress the seismic wavelet while minimizing the removal of desired cyclical geology, that might mimic otherwise unwanted reverberation noise. Step 218 allows choosing of the best decon parameters, including the possibility of adjusting the time domain spectral balancing passband. It is rare that a prediction distance of more than one time sample would be appropriate, so the parameter that is most sensitive to the geology of an area of interest is the length of the spiking decon filter.

A set of brute stack traces using only a few stacking velocity functions from well log RMS interval velocities or previous velocity analyses can be created for fewer than twelve common midpoint positions scattered across the area of interest, preferably at the position of wells with acoustic and density logs. These initial stacked traces should not include traces with very long shot-receiver offsets, because random noise reduction is the intent here, not multiple reflection elimination. Two different displays for each stacked trace are recommended:

(a.) An autocorrelation function to reveal any reverberatory energy in the convolution of the wavelet time series with the earth function time series. A derision must be made regarding the source of any correlation highs or lows away from the central maximum, and the decon filter length is chosen to attenuate that energy deemed noise. If the filter is chosen too long, reflections from valid cyclical geology could be destroyed and resolution reduced. If the length is too short, near-surface ghosts will reduce the resolution of any valid reflections. The autocorrelation energy far removed in time from the central maximum can often be attacked by the stacking procedure if it is not geologically induced. Such geological induction typically occurs by a dominant period in the depositional history. Autocorrelations of bandlimited acoustic impedance logs can be helpful in recognizing cyclical geology that should be preserved by the decon.

(b) Each stacked traces should be plotted at an expanded time scale (e.g., 20 inches per second), with a series of different length decon filters applied. These can then be compared with synthetic seismograms or synthetics from nearby wells. The synthetics should be built from actual transit time and density log (i.e., reflectivity) data, if possible. They can also be built using log conversion approaches such as Faust's equation and Gardner's equation to create pseudo-acoustic transit-time and pseudo-density logs from resistivity and interval transit time logs, respectively. Using an approximate time-depth velocity function and a zero-phase bandpass filter, identical to the time domain spectral balancing frequency range previously discussed, a synthetic seismogram can be generated to compare to nearby decon test traces. The filter length should be chosen by the filter that gives the best match of the stacked trace with the synthetic trace.

Steps 214 and 216 usually result in a trace that possesses a broadband wavelet, observed on any strong reflection event as a high amplitude peak or trough followed by lower amplitude side lobes. This creation of a dominant peak, in the shape an unknown wavelet, by time domain spectral balancing permits the Wiener-Levinson type decon filter that follows to attenuate the side lobes of most wavelets. The broadband fully-deconvolved output trace now has a nearly zero-phase wavelet even though the input trace wavelet and the decon filter itself were both assumed to be minimum phase (one-sided, not symmetric). The side-lobe reduction is noticed because the final time domain spectral balanced traces often match favorably to synthetics made with a broadband, zero-phase wavelet with low-amplitude sidelobes. This simple, high and low frequency wavelet is one of the most powerful results of the processing sequence discussed above.

Next, during step 220, a zero-phase, high-cut, bandpass filter operator is used during a first iteration or pass to facilitate the derivation of both the residual time (static) corrections and the velocity-related (dynamic NMO) corrections. The magnitude of the variations in surface elevations and near-surface velocities determines the maximum frequency content suitable for deriving these two types of corrections. The resulting narrow-band, filtered data are used only temporarily, in this first pass, to avoid possible cycle-skipping in the cross-correlation processes used in both derivations. Final static and normal moveout corrections are later derived from the full bandwidth data after the robust, first-pass corrections have been applied.

Step 222 which is next is a standard derivation and application of residual time shifts after the elevation corrections described in step 206 above, in the same surface-consistent manner as described with respect to surface-consistent spiking decon in step 216 described above. The two-way travel time (TWT) relative to a user-specified datum surface can be calculated, for any reflection event, by assuming a trace's total residual static (TWT shift) is given by the sum of the static (TWT shift correction) due to the source point and the static due to the receiver point. Many commercial algorithms exist for performing of this procedure.

Step 224 next performs a standard surface-consistent amplitude scaling of each fully-deconvolved trace. Surface-consistency is achieved in a manner analogous to that referred to in steps 216 and 222, above. However, in step 224 it is the magnitude of the RMS amplitude of each trace that is adjusted.

Step 226 uses the output from step 224 as input. Step 226 is a standard NMO stacking velocity analysis and correction computation again available in many algorithmic forms. Stacking is the term given to the summing together of single-fold (i.e., no stacking performed) traces to form a higher signal-to-noise-level stacked trace. Summing the samples from N single-fold traces produces one N-fold stacked trace.

Prior to the summing together of these N traces, whose source and receiver pairs all have midpoints that fall within the same pre-defined common midpoint or CMP cell, the traces are sorted and displayed side-by-side in a CMP gather. Here a reflection wavelet on the nearest source-receiver (S-R) trace at, say, time $T_0$ can be seen to "move out" in time, forming an arch-shaped curve (often hyperbolic) from the nearest to the farthest S-R distance trace. Rather than at time $T_0$, the Mth trace has the wavelet from (presumably) the same subterranean zone (often called a "point") at time $$T_m = T_0 + \Delta T_m,$$

where "$\Delta T_m$" is called the "move-out time", caused by the longer travel paths between more distant sources and receivers. For a horizontally layered, constant velocity medium, the shape of the move-out curve, plotted as a function of increasing S-R distance ($X_m$), is governed by the velocity, V, of the medium.

For the real earth, the layers are not usually horizontal everywhere nor is the speed of sound constant for all depths everywhere. Fortunately, industry experience has shown that using an empirically derived stacking velocity ($V_{stk}$) in place of V, in the simple, straight-line ray path NMO equation:

$$T_m = \sqrt{T_0^2 + \left[ \frac{x_m^2}{V_{stk}^2} \right]}$$

does an acceptable job of correcting traces for NMO in many geologic settings.

After proper NMO correction, all of the primary (non-multiple) reflection wavelets on each trace in the CMP gather should be at very nearly the same TWT, allowing a sample-by-sample sum or stack to enhance the primaries and attenuate any non-primary-reflection energy that does not obey the normal move-out equation. Because the process of the present invention uses a much broader frequency bandwidth than that usually resulting from traditional processing, which seeks smooth, coherent, overlapping peaks and troughs for structural contour mapping, it is incumbent that the stacking procedure in step 226 preserve the high frequencies obtained by the decon procedure of steps 214 and 216, discussed above.

The NMO correction in step 226 is a "dynamic time shift" and is contrasted with the static bulk shift of an entire trace seen in the elevation corrections, above. It moves each primary-reflected wavelet (at time $T_m$) on each trace to its new zero-offset time position ($T_0 = T_m - \Delta T_m$, as given by the NMO equation) on the corrected version of the same trace. If, on a CMP gather's "far" trace, this correction is in error by half the wavelet's dominant period (e.g., an error of 10 milliseconds for a 50 Hz wavelet), a peak can occur at the same travel time as a sidelobe trough on the "near trace" in the gather, and the stacking might tend to cancel the amplitudes of this particular reflection on the output stacked trace.

Step 228 which follows in the first pass or iteration is the application of the above-derived, static and NMO corrections to the full bandwidth volume produced by step 216, for use in subsequent processing steps. The previous first pass of residual elevation statics and residual NMO corrections in step 214 were run on a narrower bandwidth volume. This was done so that the potentially large corrections might be derived with less concern for cycle skipping in the various cross-correlations performed. However, the final corrections are made to be more precise in step 228.

Because static corrections can strongly influence the apparent NMO corrections, and the NMO corrections influence the correction of statics, it is important to have a reasonable statics solution before the final velocity analysis. It is also important to have a good approximation to the move-out solution prior to the determination of the final residual static solution. After initial application of the first-pass residual statics and NMO corrections during a first iteration of steps 222, 224, and 226, the final statics and NMO corrections are derived from and applied to the full bandwidth dataset during a second processing sequence of these steps after step 228. For this purpose, control is transferred by decision instruction 230 to step 228 after the first interaction through steps 220, 222, and 224. On the second arrival at step 230, control is transferred forward, as will be described.

After step 228, during the second iteration of surface consistent residual statics, processing during step 222 is the same as previously, except that the corrected, full-bandwidth volume is used with processing parameters reset appropriately for the expected smaller corrections. Similarly, during the second iteration or pass through step 224 of surface-consistent amplitude scaling, processing is similar although another amplitude adjustment may not be required for a particular area.

Processing through step 226 in the second iteration is the same as previously described for NMO stacking velocity analysis. The full-bandwidth derivation and application of the final residual elevation statics and NMO corrections, derived in this two-pass procedure, substantially completes the pre-stack processing phase.

After decision step 230 determines that a second pass or iteration has been completed, control is passed forward to step 232. During step 232 offset-dependent trace balancing is performed to derive and apply amplitude corrections. This is done by examining the data for consistently high or low RMS amplitudes for traces with user-specified ranges S-R offset (e.g., near, middle, and far), in user-specified time windows, over either the entire survey area or overlapping areas for large three-dimensional seismic volumes.

Next in the processing sequence is a decision step 234 to determine whether pre-stack or post-stack migration is to be performed. If post-stack migration is selected, processing moves to step 236, where a standard CMP stack is performed. If desired, a final adjustment to the shallow muting functions is also made at this time. As mentioned above, for a nominal N-fold stack, a CMP stack adds together the first sample in each of the N fully deconvolved and fully corrected traces in each CMP gather, and (after dividing it by the number of non-muted samples) deposits this "average" value into the first sample in the output CMP stacked trace. This is repeated during step 236 for each sample on the N corrected traces, and results in a very broad frequency bandwidth, but otherwise conventional, CMP stacked trace for every CMP cell or trace in the three-dimensional volume.

The processing in step 236 is formation of a traditional CMP stacked trace. Specifically, each stacked trace is assumed to represent a digital time series that, under some reasonable assumptions, would be recorded by a receiver placed at the datum elevation, z, at the CMP coordinates, x and y. The subsurface is assumed to be composed of a three-dimensional matrix of individual volume elements or cells, each one called a voxel with an elemental volume VOX given by $$VOX = A*(0.5*\Delta T)/(TT_{ave}),$$

where:

A=the three-dimensional seismic survey cell area or (Inline trace spacing*Crossline trace spacing);

$\Delta T$=the seismic recording time sample interval, and $TT_{ave}$=the average interval transit time vertically through the voxel.

The acoustic source for the earth's motion recorded by this receiver is assumed to be either a plane compressional wave emanating from the horizontal datum surface and reflecting from each subterranean change in acoustic impedance; or, alternatively, the sum of the first-arrival wavelets from each of the exploding or Huygens' point source voxels. In the latter case, the wavelet's time position on the CMP trace is doubled to give the assumed two-way travel time, as each voxel produces an expanding wave front with initial amplitude proportional to the vertical change in acoustic impedance.

The processing criteria of the present invention, however, does not base its geophysical modelling on the traditional concept of an earth composed of layered reflectors. Rather, the earth formations have been compartmentalized into a number of three-dimensional blocks or voxels, each postulated to be composed of a single material with uniform seismic velocity and material density. For the purpose of the present invention, these voxels (also called "volume pixels") are referred to as individual volume elements. Thus, the three-dimensional volume of the earth beneath an area of interest is generalized to that of an earth composed of a number of individual volume elements. The process of the present invention accepts most traditional modelling concepts as valid, but treats a processed CMP stacked trace as if:

(A) It is composed of the superposition (linear sum) of a very large number of primary reflection coefficients or bandlimited spikes, with little distortion of the bandlimited "wavelet" shape or amplitude due to the temporal position of the wavelet;

(B) Each of its broadband wavelets has a maximum amplitude that is a measure of the (vertical) change in acoustic impedance across a subterranean volume element or voxel;

(C) It receives one, and only one, identically shaped but varied in amplitude wavelet from every subterranean voxel in the ensonified volume. This also assumes no multiples, no ray theory "shadow zones", and acknowledges considerable uncertainty about the boundaries of the volume in the presence of dipping layers and near the edges of the survey surface outline;

(D) Each reflected wavelet is recorded at a temporal position that is twice the time it takes for the expanding (Huygens) wavefront, radiating from the voxel, to reach the CMP receiver location (i.e., the "normal incidence" or "zero-offset" assumption), assuming that the two-way travel time is less than the field-recorded trace length;

(E) It contains no multiply reflected wavelets or multiples. If the low-fold, relatively small source-receiver offset, stacking process described above does not sufficiently eliminate multiples then additional multiple elimination may be required. This may be done, for example, by Radon transform filtering or a more deterministic wavelet shaping deconvolution, based on the shape of the downgoing wave from a bore hole vertical seismic profile.

(F) Many of its wavelets can be characterized as diffraction wavelets, generated by the corners or edges of discontinuous surfaces of the common-impedance objects according to the present invention; and (G) Other wavelets it contains are from Fresnel zones on dipping layer surfaces but, at this stacked volume stage, are misplaced in the three-dimensional earth model.

At this point, it is important to list some properties that distinguish the process of the present invention from traditional processing. The present invention does not attribute the following properties to a side-by-side arrangement of CMP stacked traces. The present invention is predicated on perceiving that a stacked seismic trace or line or volume does not:

(a) Lend itself to automatic, computer-assisted, artificial intelligence analyses, usually because of the great number and variability of poorly focused buried objects, due to the general complexity of the subsurface geology;

(b) Represent any fundamental properties along any realizable well path, because the superimposed wavelets in the stack come from many directions and a precise match to any particular well's synthetic seismogram (or vertical seismic profile) is not to be expected; nor (c) Contain drilling-risk-reducing or excavation-risk-reducing information about the earth directly beneath any seismically identified surface (x,y) CMP location.

Typically, step 238 is supplemented by a following quality control step 238. Often, on receipt of new information, especially well-tied, interpreted structural configuration of geologic horizons and/or velocity data from a borehole, reprocessing can result in improvement of the stacked volume. Quality control step 238 is performed only if post-stack migration is chosen during decision step 234. The quality control involved uses inlines, crosslines, and timeslices, of both the seismic reflectivity time cube, and the stacking velocity time cube, plus unstacked CMP trace gathers. It is done to confirm that the traces resulting in the proposed final stack reflectivity volume have, indeed, been properly corrected with both static (bulk time) and dynamic (NMO-velocity time) adjustments applied correctly.

Because step 238 searches for errors in the vertical (travel time) movement of samples prior to the stacking summation, and is less concerned with the wavelet's shape or bandwidth, the displayed proposed final stack traces for quality control should be high-cut or low-pass filtered to remove frequencies above some user-chosen level. Again, the present invention regards these high frequencies as information about small, generally non-layered common-impedance objects normally eliminated by seismic-noise-reducing filters in traditional data processing sequences which are designed to enhance the reflection continuity of possibly faulted surfaces. Nevertheless, these high signal frequencies are unnecessary and even bothersome for the present search for incorrect time shift corrections, so they should be temporarily removed.

Step 238 may be accomplished by manually reviewing a user-selected subset of the proposed final stack quality control traces, both pre-stack (CMP gathers) and post-stack (proposed final stack). Contoured or color slices through the NMO stacking velocity volume and contoured or color maps of the total source elevation static and receiver elevation static time shifts applied are also reviewed.

During step 238 the concept of subterranean layers can be helpful. On the lower frequency and narrower bandwidth traces, real geological features (such as faults, salt welds, and erosional unconformities) almost always have some non-vertical orientation or inconsistent offset as a function of two-way travel time and depth. If the traces are displayed as either variable intensity or variable-area/wiggle-trace, and at a compressed trace spacing, a tell-tale vertical alignment of processing artifacts (static busts) is often accentuated.

Static-bust errors appear (on individual CMP gathers and, less dearly, on the stacked profiles) as vertical lines of lateral discontinuity, interrupting otherwise continuous smoothly varying reflection events, usually seen as sets of coherent, low frequency, high amplitude, side-by-side troughs or peaks. The contoured slices through the stacking velocity volume obtained for quality control step 238 can also be used during subsequent processing to confirm that the NMO corrections applied are appropriate for the local rocks velocities or, if inappropriate, explainable by surface elevation or near-surface velocity variations.

The NMO velocity correction at a point (x,y, two-way travel time) must move the amplitude at time sample $T_d$, on a trace with shot-to-receiver offset distance d, to its equivalent zero-offset time, before it can be summed with the other time-corrected traces in the CMP gather. Prior to NMO correction, reflection wavelets move out along NMO hyperbolas that are sharply curved for shallower times and slower velocities, but more gently curved for deeper times and faster velocities.

In many ways, the stacking velocity is simply a parameter that governs the curvature of the processor's NMO correction hyperbolas. The correct stacking velocity function is the one that flattens the primary reflection wavelets' arrival times in a CMP gather, and its magnitude depends on many factors other than real rock velocities: layer dips, maximum shot-to-receiver distance, near-surface interval velocity anomalies, etc. It is typical to use a well-known property of the stacking velocity field for a horizontally layered earth that says that, if the shot-to-receiver distances are small, then the stacking velocity function will be close to the rock column's RMS interval velocities as a function of two-way travel time. In this way, seismically derived stacking velocities are constrained by calculating interval velocities and requiring them to be within reasonable rock interval velocity limits.

The final concept that is important in the stacking phase of step 236 is that the stacking velocities, i.e., the NMO hyperbolic shapes, are related to the diffraction hyperbolas and the so-called migration velocities that generate them. It is important to note that the stacking velocity hyperbolas in step 238 are different from the migration velocity hyperbolas, along which three-dimensional pre-stack or post-stack seismic time samples are moved in a manner to be set forth. The latter are used to more correctly focus the elements or objects that are poorly imaged in this stacked trace volume.

Traditionally processed pre-stack migration was performed using a velocity vs. two-way travel time subsurface model with a manageable number of major, constant interval velocity layers, while post-stack time migration was usually carried out using a percentage of the NMO stacking velocities. Precise measurement of the shape of an event's moveout within a CMP gather can lead to precise NMO corrections with no residual moveout and the acceptable conversion of non-zero-offset traces to their zero-offset counterpart. But NMO hyperbola shapes are inevitably affected by many non-rock-velocity factors, such as bed dip, source-receiver offset distribution, imperfect station elevation data, imperfect knowledge of sub-weathering velocities used in datum corrections, etc., that are present on most CMP seismic traces.

Velocities taken directly from the contoured, NMO-stacking-velocity displays during step 238 should not be used for later migration. Rather, they should be used only to verify that the static and dynamic corrections are reasonable, and to expose lateral velocity gradients that may or may not be related to rock interval velocity gradients, which are important to a high-resolution volumetric model.

According to the process of the present invention, it has been found that, because of the enormous complexity of the earth's three-dimensional subsurface, erroneous data models can be formed if the data are pre-judged before processing. In particular, it is counterproductive to treat high-frequency, non-coherent seismic energy as unwanted noise, after examining common-source-sorted traces (e.g., field records) or unmigrated stacked traces. Valuable information may be removed in any attempt to increase the signal-to-noise ratio (via filtering) prior to migration.

Step 240 which follows step 236 creates interpolated CMP cells at the desired final CMP grid spacing. The traces can be interpolated, either using one of a number of time-domain interpolation algorithms or, especially if pre-stack migration is chosen, using a three dimensional time migration algorithm that allows traces to be output to other than the input CMP trace locations.

Step 242 is performed directly after decision step 234 in the event of a processing decision to pre-stack or, alternatively, after post stack time migration in steps 236 and 238. The migration procedure in step 242 of the present invention is performed to enhance the lateral and vertical resolution of imbedded common impedance object or volume element by collapsing the resolution-limiting, first Fresnel zone radius to a theoretical minimum of one dominant wavelength (equal to the local velocity divided by the dominant frequency). Step 242 is also done to position the voxels or volume samples annexed to each common-impedance object more properly in three-dimensional space.

These two objectives are interrelated because the more accurately the three-dimensional voxels of a subsurface object are re-positioned, along diffraction curve surfaces, the better focused in the subsurface space the object is said to be.

The process of step 242 uses a three-dimensional pre-stack or post-stack algorithm that generates a high-fidelity 3D seismic volume with minimal bandwidth reduction and phase distortion and with relative amplitude relationships preserved. The amplitudes of the seismic wavelets in the volume must depend, as much as possible, on subterranean changes in acoustic impedance and therefore represent band-limited reflectivity spikes.

The process of the present invention avoids the use of partial pre-stack migration (such as DMO), lateral coherency enhancement (such as F-X deconvolution), and vertical trace RMS amplitude balancing (such as automatic gain control, or AGC). All of these prior art processing methods contribute to more continuous looking peaks and troughs on seismic profiles and, therefore, smoother structural contour maps, but they also contribute to poorer resolution of valuable information about common-impedance objects. According to the present invention that is why they are to be avoided.

The process of the present invention also avoids three-dimensional (pre- or post-stack) depth-migration. Accurate, broadband depth-migration requires the iterative construction of many necessarily incorrect depth models of the earth's velocity field. With the present invention it is preferable that pre-stack or post-stack time, not depth, migration be performed in the time and not frequency domain, for common-impedance object resolution reasons. This can be done using a one-pass finite-difference wave equation migration algorithm or possibly a cascaded series of applications thereof. Time-to-depth and time-to-thickness estimates should be made for the identification and analysis of a detected common impedance object, and in preparation for extraction by drilling or excavating.

During step 242, two alternative processing time domain migration procedures are available, based on the results of decision step 234. If the choice during step 234 for migration during step 242 is pre-stack, a velocity volume model might be in the form of a three-dimensional dipping-layered or faulted depth model of the various rock-interval-velocity regions. Using a ray-tracing algorithm, or a finite difference approximate solution to the wave theory eikonal equation, a five-dimensional one-way-travel-time matrix $T(x,y,z,X,Y)$ is generated.

This is a five element matrix of travel times, T, from every Huygens-source point $(x,y,z)$ in the three-dimensional gridded subsurface to every possible source or receiver station point $(X,Y)$ on the two-dimensional gridded datum surface. It does not use the traditional diffraction hyperbola shapes along which seismic reflections or samples are migrated under the control of migration velocities assuming a uniform, constant-velocity, horizontal layer model.

Rather, during step 242, they are replaced with a more accurate representation of the actual Huygens-source-point diffraction curve shapes. The migration performed can actually be a sophisticated depth migration of the required fine time sample interval for every pre- and post-stack trace. However, the output traces should be converted back to two way travel time using the five element travel-time matrix, placing each seismic amplitude value $A(X,Y,Z)$ for the depth migrated trace at location $(X,Y)$ into its vertical two-way travel time position on the corresponding time-sampled trace at $(X,Y)$.

Multiple velocity model iterations may be necessary depending on the local geologic complexity and resolution requirements. Analogous to the stacking procedure, where source-receiver offset distances must be limited if updip reflection moveout within a CMP is a problem, the migration aperture or distance a sample is allowed to move can be adjusted. This is done to improve focusing in areas far from velocity control, where rock interval velocities are most uncertain.

The dipping-layered rock-interval-velocity model should be made using the non-seismic subsurface information available from both field and laboratory measurements. At least four geologic cross-sections are preferably used, tying all of the non-seismic control points, such as wells with known or estimated three-dimensional wellpaths, with estimates of attributes for each blocked model layer. The preferred attributes to be used are:

1. Depth below the seismic datum surface of the base of the layer. This is often a major formation boundary, with a significant velocity contrast shown by borehole-logged, laboratory-measured, or outcrop-measured interval transit times.

2. Average velocity and, if necessary, vertical gradients within each layer, i.e., thickness divided by one-way-travel-time, or a $V_0+K*Z$ linear interval velocity function.

The quality control of these blocked velocity cross-sections and the construction of the required interval velocity cube, is accomplished by creating a set of constant depth slice maps (e.g., every 2000 feet of depth, for a petroleum application example). Such maps show both the contoured interval velocities and the subsequently computed depth-conversion (average) velocities at that depth. After editing, re-computing and re-displaying, to insure that these constant-depth velocity contours show acceptable lateral and vertical velocity gradients, the next sequence is to convert from constant-depth slices to constant two-way-travel-time slices to create an estimated depth time cube (EDT cube). The EDT cube is a fundamental product of the process of the present invention. It represents a depth or time function used to locate subsurface features of interest. The EDT cube so formed is stored for subsequent use in estimating the depth to any common impedance object identified beneath the area of interest. It is important to note that an EDT cube is not normally accurate enough to compute common impedance object thicknesses. This is because of the rapidly changing small-scale (thin, lenticular, laterally discontinuous common-impedance object scale) velocity variations found in most areas.

If the choice during step 234 for migration of step 242 is post-stack, as is preferable for gently dipping, simple velocity areas, the migration velocity time cube can be represented by either the time-sliced EDT cube, formed in the manner discussed above, or a time-sliced RMS velocity time cube. It is important not to use for this purpose some percentage of smoothed stacking velocities, other than to identify possible lateral velocity gradient areas away from well control. An RMS (migration) velocity volume is preferably constructed in the computer from the EDT cube as follows:

1. Slice the EDT cube at an appropriate two-way time interval (e.g., 0.100 seconds) and calculate a time-depth function (depth vs. TWT) for each final three-dimensionally migrated output trace point (X,Y);

2. Calculate an "average interval velocity" function related to two-way time at each surface (X,Y) point, using the depth thickness of each layer divided by half the constant two-way time (e.g., 0.050 seconds) of each layer;

3. Calculate a standard RMS "average interval velocity" function of vertical two-way time at each (X,Y) point. The RMS velocity at $TWT_0$ beneath $X_0, Y_0$ is the square root of the time average or mean of the squares of the blocked average interval velocities above the time $TWT_0$, directly under surface point $(X_0,Y_0)$.

As an example, if average interval velocities (layer thickness divided by total transit time for the layer) are 5000, 6000, and 7000 feet per second, in each of three 0.100 second thick layers with bases at TWTs of 0.100, 0.200, and 0.300 seconds, respectively, then the RMS velocity vs. TWT function would be:

5000 f/s@0.100 seconds (=250 feet@5000 feet/second)

5523 f/s@0.200 seconds (=250 ft+300 feet=550 feet deep)

6055 f/s@0.300 seconds (=250 feet+300 feet+350 feet= 900 feet deep).

This RMS velocity function is not unique for a particular interval, but depends on the TWT slice interval selected. The finer the interval, the faster the RMS velocities. For this reason, a pre-stack time migration, using the five element one-way time matrix T(x,y,z,X,Y), is usually preferred. However, the difference in common impedance object resolution caused by differences in relatively fine two-way time intervals are small for many localities. The construction of a T(x,y,z,X,Y) travel-time matrix can be difficult and expensive, so for most post-stack time migrations, this RMS velocity time cube provides useful resolution.

Quality control step 244 on inlines, crosslines, and time slices is a last verification in the processing sequence, made to examine the quality of the migration of step 242 prior to a final boost to the wavelet's frequency bandwidth. The vertical and horizontal slices usually provide clear evidence for any processing artifacts caused by the velocity or five element matrix used. As in quality control step 238, it is helpful in step 244 to look for evidence of over- or under-migration at fault-induced discontinuities and localized bright amplitude reflections.

If pre-stack time migration is being used during step 242, it is also possible to use migrated Common Reflection Point (CRP) gathered traces, from selected output trace positions before the pre-stack depth migrated traces are stacked, or summed together. This can be done to monitor the accuracy of the velocity region model. This is done prior to performing the full volume three-dimensional migration, and can be of great value in editing the dipping-layered velocity model.

Step 246 is a second processing of the data by time domain spectral balancing, over the same frequency bandwidth used in step 214, as discussed above. For this second time domain spectral balancing, the filters used to decompose the trace into narrow frequency bands are like those in step 214 but should be zero-phase, rather than minimum phase. Both the stacking and migration performed prior to step 246 are dynamic, sample-moving processes that modify the length of the seismic reflection wavelet on each trace, usually stretching it more for shallow times than for deeper times. If processing in the sequence of steps 214 and 216 is proper and the phase distortion minimized for at least 45 degree dips in step 242, then the wavelet going into and coming out of the migration is nearly zero-phase.

The primary concern of performing step 246 is that the time-variable stacking-NMO and migration-diffraction hyperbolas (or their five element matrix, model-based travel time counterparts) may have distorted the wavelet's frequency spectrum in a time varying manner. This final pass of processing in step 246 is done to again balance the frequency spectrum of the trace and, using the normal assumption of a broadband earth reflectivity function, assure that the seismic wavelet maintains a uniform shape as two-way time (and depth) increase.

Thereafter, during step 248 an optional final filter test often is made to determine the final frequency bandwidth of the reflectivity volume's wavelet. The procedure is standard in the industry, where signal and noise are distinguished by their traces-to-trace continuity, and is available at the processor's discretion.

The processing sequence described above during steps 202 through 248 begins with a collection of three-dimensional recorded single-fold reflection seismic traces, coveting a generally layered earth, that contains objects of potential interest which may be of various sizes and shapes. The travel times of the seismic traces are then corrected to a datum surface using a uniform near-surface velocity. Thereafter, the amplitudes of the traces are balanced to preserve relative relationships, and the frequency spectra of each trace's wavelet is balanced in time.

If post-stack migration is selected in step 234, NMO correction of the traces is made to compensate for differences in shot-receiver offset distances. All traces whose midpoints fall into a common (CMP) cell are then summed or stacked. The data are then processed to build a migration velocity time cube from the stacking velocity gradient information and RMS interval velocities, making use of non-reflection-seismic data (such as well logs and velocity surveys). The traces are then migrated with a one-pass three-dimensional time migration program, and again the wavelet spectrum is balanced.

If pre-stack time migration is elected during decision step 234, the data are processed by building an EDT cube from the stacking velocity gradient information and well interval velocities, making use of velocity survey data. The traces are then migrated, using a five-element one-way time matrix, with a one-pass three-dimensional time migration program, and again balance the wavelet's spectrum.

It is important in this processing not to use multi-channel filters in the time or frequency domain to enhance reflection continuity. If used, it will be to the detriment of common-impedance object resolution.

Figure 2:
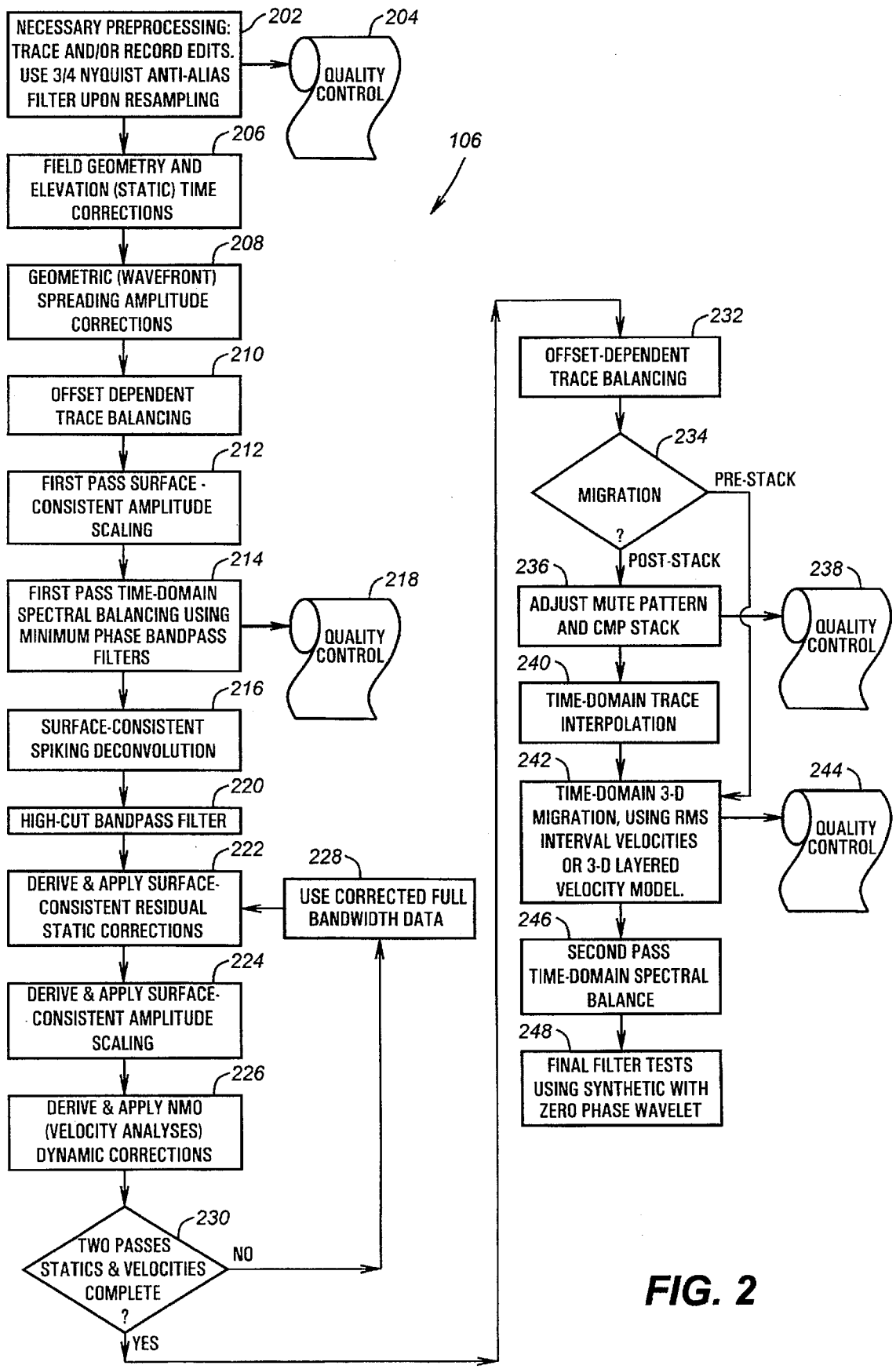
FIG. 2 is a schematic diagram of a sequence of signal processing steps performed during the process of FIG. 1.

As has been set forth, the processing sequence depicted in FIG. 2 of the drawings illustrates the data processing performance during step 106 of FIG. 1. After step 106, the processed data from that step are converted into a form representing the relative acoustic impedance during step 108.

Converting Seismic Reflectivity Measures Into Seismic Impedance Measures

Figure 3:
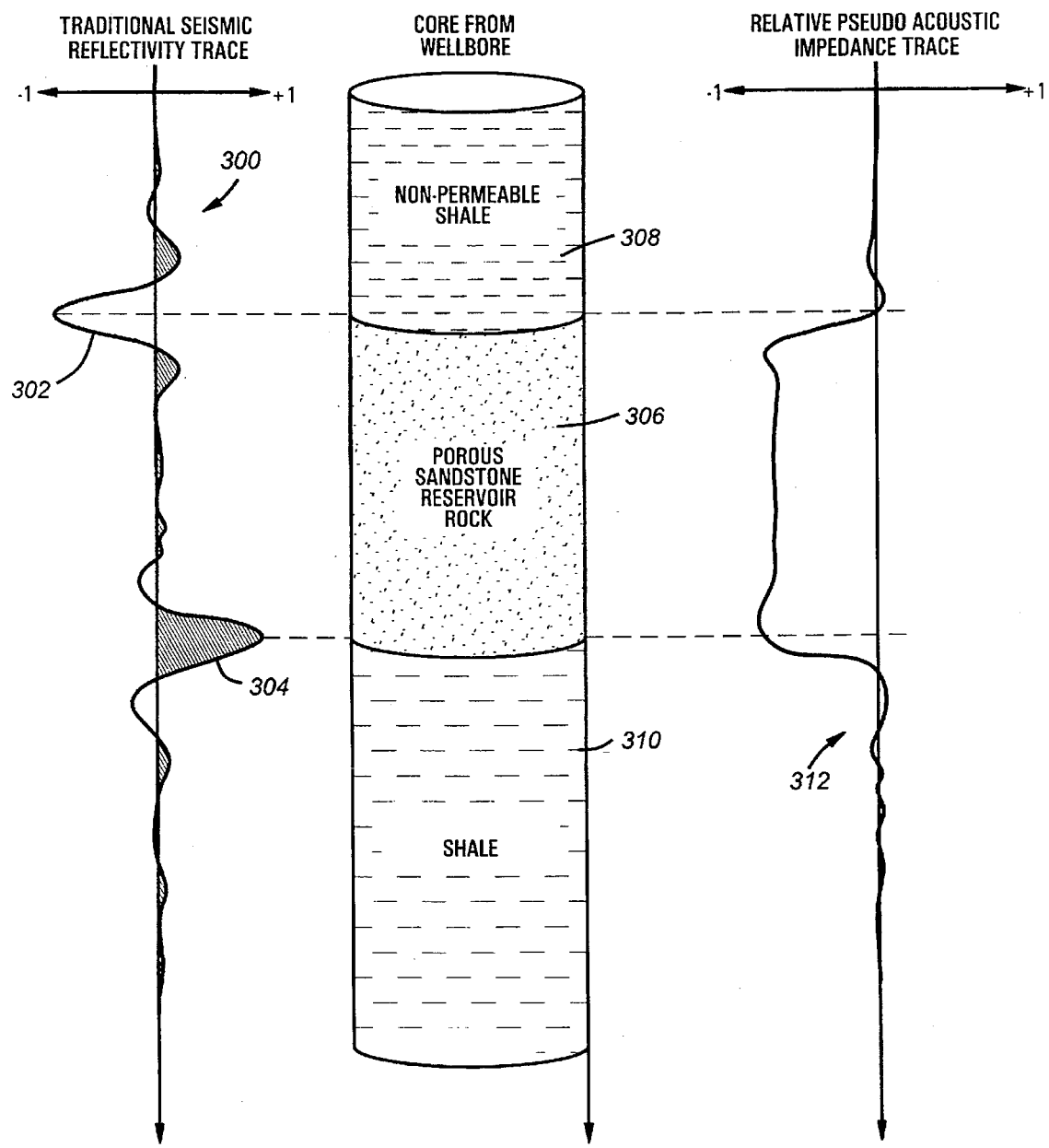
FIG. 3 are example displays of data processed according to the present invention.

FIG. 3 illustrates the result of performing step 108 of FIG. 1. Step 108 is typically performed in the computer which performed step 106. The reflectivity data for the volume samples obtained during step 106 are converted into impedance samples. The impedance samples represent a measure of the relative ease or difficulty for sound energy or seismic waves to travel through that sample.

FIG. 3 depicts conversion of a seismic reflectivity trace into a time series representing the relative natural logarithm of the average acoustic impedance I of an individual volume element. An example trace 300 contains only a pair of broadband reflected wavelets 302 and 304 from the changes in acoustic impedance at the top and base of a reservoir layer or common-impedance object shown as a sample reservoir core 306 between shale layers 308 and 310.

According to the present invention, the conversion equation is a cumulative summation of reflectivity samples:

$$\sum_{i=1}^{N} R_{i,i+1} \simeq \int^{N}_{i=1} \frac{dI_i}{2I_i} = \frac{1}{2} \ln(2I_N) + C,$$

where C is a constant. Expressed in another form, seismic "impedance trace" sample N is approximately the relative logarithm of the average acoustic impedance at time sample N as given by $$A \ln(I_N) + C' = \sum_{i=1}^{N} R_{i,i+1}$$

where A and C' are constants to be determined empirically, if required. This is done in the computer simply making a running sum or digital integration of the reflectivity samples.

The summation or integration is preferably followed by a very low-cut bandpass filter for example, to attenuate frequencies below 3 Hz, to remove any "direct current" component introduced by the first signal samples in the sum. No high-cut filter is generally required.

The processing clearly works best when the reflection wavelet shape is symmetric about a strong central maximum with few and small side-lobes (i.e., zero-phase and broadband) as shown in trace 300. The resulting trace from performing processing step 108 on data like that of trace 300 results in a trace 312, which is called a one-dimensional impedance trace. A regularly spaced two-dimensional array of such impedance traces, covering a surface area of interest, is called an impedance time cube (FIG. 4), according to the present invention.

For the actual earth and three-dimensional reflection surveys, horizontal homogeneous and isotropic layers are extremely rare and normal incidence (or, coincident source and receiver positions) is even more unusual. Therefore, processing according to the present invention is not to recover the actual acoustic impedance as a function of depth. Rather, during processing step 108 a useful approximation to the relative logarithm of the acoustic impedance as a function of two-way travel time is formed.

Forming Output Displays of the Seismic Impedance Measures

After the processing of step 108, the resulting data are then transferred from the computer which performed step 108 for processing during step 110 (FIG. 1) in an interactive data display or volume visualization station permitting two-dimensional display of three-dimensional data. There are several such systems commercially available for performing this function. A suitable such interactive system is called VoxelGeol.1 from Vital Images, Incorporated running on an IRIS 40/310VGX platform from Silicon Graphics Computer Systems.

Figure 4:
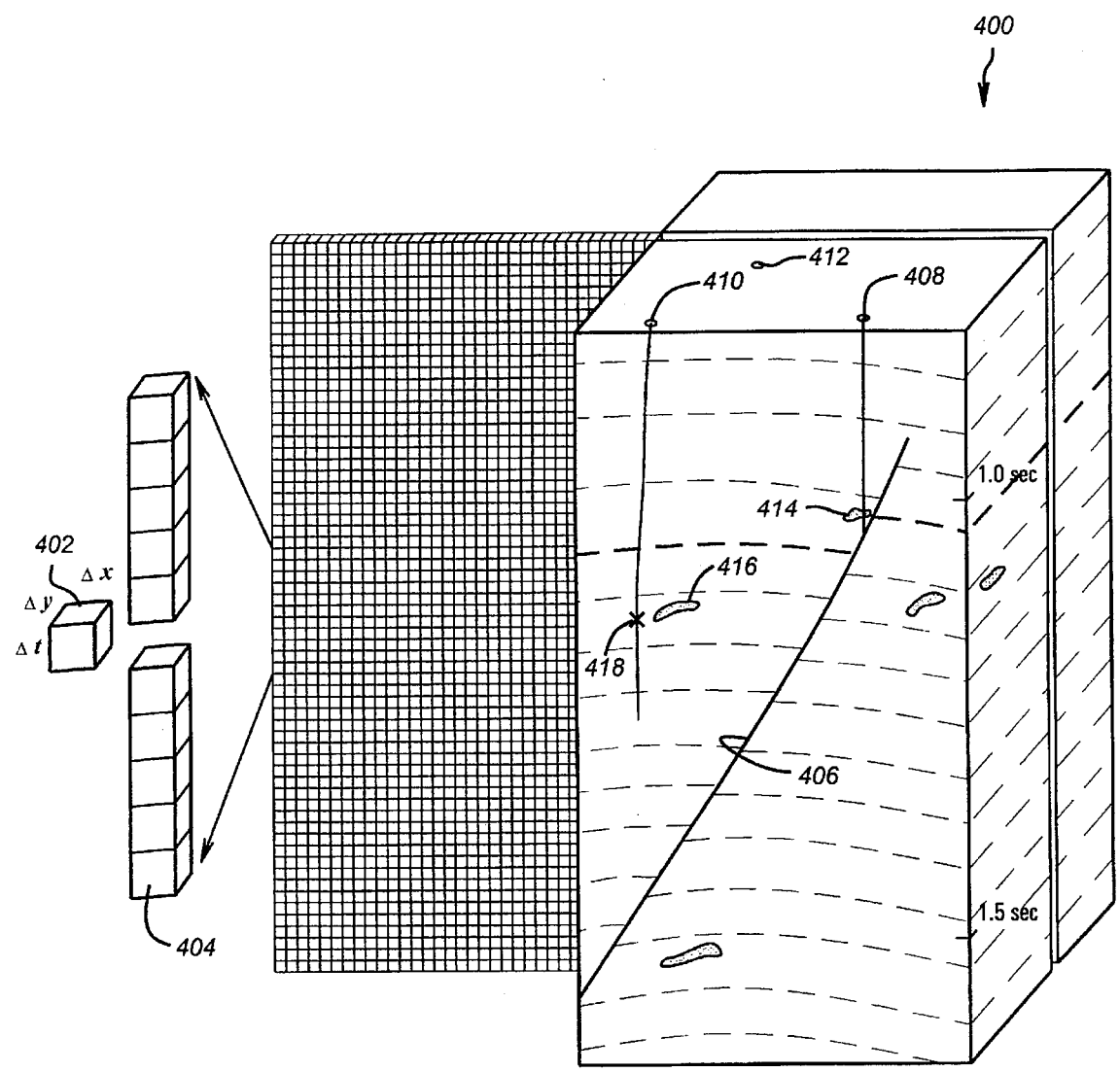
FIG. 4 is a schematic diagram of further details of the process of FIG. 1.

FIG. 4 illustrates a display formed after the steps in seismic and non-seismic data loading, and quality control validating, into such a volume-visualization computer system during step 110. Aerial photographs, topographic maps, and other commercially available renderings of the area of interest gathered during step 102 (FIG. 1) are valuable for use as overlays or underlays, to identify discrepancies in the locations. Example non-seismic information includes the following.

Locations, names, and types of logs run for drilled wells (including surface locations, subsurface wellpaths and, whenever possible, a set of cross-sections showing depths to identified "formation tops");

Cultural data (e.g., cities, towns, road- and railways, canals, mines, excavations, etc.);

Outlines of legal and political boundaries, real and mineral estate ownership outlines, and active lessee data; and Surface geological and geomorphological data, such as ground cover (wood, swamp, marsh, etc.), mountains, ridges and shorelines of oceans, lakes, rivers, streams, etc. In some instances, it may be valuable to have digital topographic and bathymetric contours.

By far the most important quality check during step 110 is the validity of placement (origin and rotation azimuth) of the seismic impedance time cube, (FIG. 4) formed during step 108. This is done by comparing (x,y)-known features of the three-dimensional survey outline to well or polygonal vertices with verified (x,y) coordinates. Seismic survey corners are the most commonly used features.

Step 110 allows verifying, not only the position of the impedance time cube, but also the location of the drill-hole data. The surface location of old abandoned wellbores, and the subsurface path of un-surveyed and presumed "vertical" holes, can be incorrect by hundreds of feet or more. Knowing the exact position of the seismic volume can, at times, allow the logged depth to a steeply dipping major fault determine the appropriate (X, Y) position of the logged well. This is possible if a reasonable time-to-depth relationship can be used to determine which of a number of possible surface sites was used to spud the well.

After the data are loaded into the workstation during step 110, they can be interactively displayed and analyzed on the workstation during step 112. FIG. 4 is a schematic diagram formed during step 112 showing an example of an impedance volume and non-seismic information, such as wellpath line segments and annotations, after being loaded into a volume visualization workstation and displayed on top and side surfaces of an otherwise opaque data display block.

It can be seen from FIG. 4 that what is shown are not traditional seismic trace samples, often displayed as variable-area/wiggle-traces on two-dimensional seismic profiles through a three-dimensional volume. Rather, the data are displayed on a video monitor as discrete contiguous individual volume elements or voxels 402 arranged in columns 404. Each voxel is typically assigned a color-coded impedance amplitude A and an opacity value K(=1, here) viewable in impedance slices through a time cube 400. A fault line 406 is dram in for clarity because the actual steeply dipping fault surface produces no noticeable reflection. The more or less continuous looking layers of low and high impedance represent real, but "noisy looking" geologic layers containing interesting common-impedance objects. Gas Well #1 at 408 and Abandoned Well #2 at 410 are shown on the edge of the time cube 400 so that their wellpath polygon lines are visible. Abandoned Well #3 at 412 is not on the edge, so its path is hidden for a rendering of uniform opacity (K=1.0) for every voxel. A low-impedance reservoir 414 which is known to be a high porosity sandstone filled with low-density natural gas is shown at 1.0 second in Well #1. The gas show 418 on the wellpath of Well #2 might be associated with the area 416 to its right. Notice the importance of correctly estimating the time to a particular depth and the precise position of each line segment endpoint on each wellpath. It can thus be seen that step 112 permits an analyst to make an initial assessment of the common-impedance objects formed during earlier processing. From this, interactive manipulation, analysis and evaluation of the voxels later may proceed.

Assembling A Volumetric Model of Seismic Impedance Measures

This is begun during step 114 where a starting voxel sometimes called a seed point or starting point is chosen. The starting voxel is the first of two parameters necessary for common-impedance object detection. Selection of a starting voxel depends upon the expected impedance of a target common-impedance object of interest and is also based on information available (expected number, depth, size, shape, etc.) about suspected targets in the area of interest. A common-impedance object can be detected by starting at any voxel within the area of interest but it is usually more useful to select a starting point based on a reason derived from non-seismic data.

Figure 5:
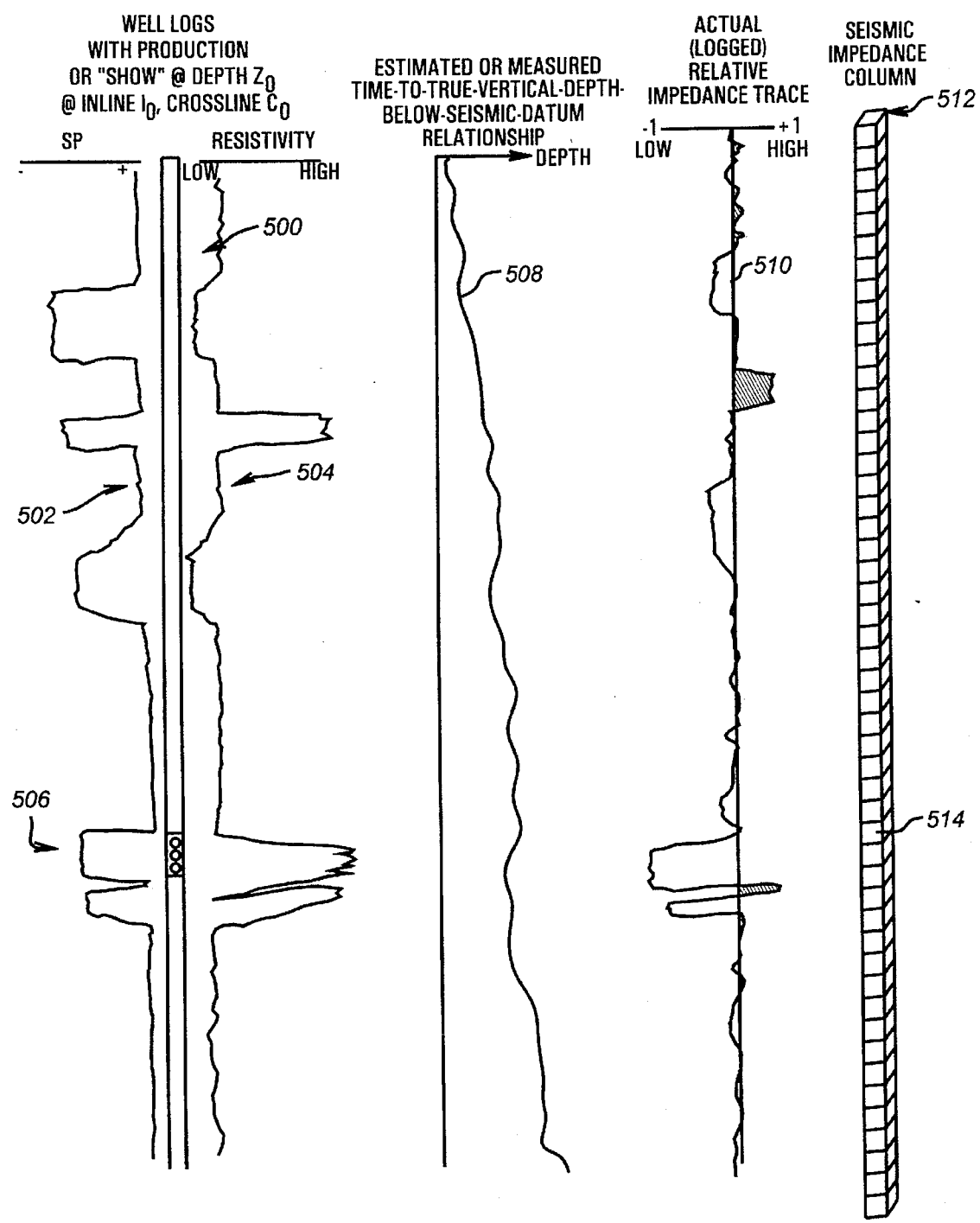
FIGS. 5, 6, 7A and 7B are example displays of results of data processing according to the present invention.

FIG. 5 gives an example of a gas field development problem. Here a well 500 has been logged and its spontaneous potential and deep-reading resistivity log shown at 502 and 504, respectively. A pay sand has been previously established at a position 506 ($X_0, Y_0, Z_0$), where $X_0$ and $Y_0$ are state plane or latitude-longitude coordinates. The pair ($I_0, C_0$) are the (In-line, Cross-line) coordinates of the nearest trace in the seismic time cube, and $Z_0$ is the depth to the top of the gas-productive perforations. Using the time-to-true-vertical-depth (TVD) relationship 508 shown in FIG. 5, depth $Z_0$ converts to a TWT of $T_0$ and so the initial starting voxel 514 is chosen at 3-D coordinates ($I_0, C_0, T_0$). The seismic data are now analyzed to locate the optimum location for an offset well take point in this same reservoir, if one is justified.

Choosing a starting point is often not a simple task. Processing corrections, filters and migration can produce seismic travel times that mis-tie the first-break times on traditional velocity surveys by tens of milliseconds. This is usually unimportant for mapping traditional seismic peaks or troughs that are greater than 20 milliseconds wide at a dominant frequency less than 40 Hertz. However, it can be very important to identification of a 6 millisecond wide (30-foot thick@10,000 f/s) low-impedance gas sand seen from a well log.

It is helpful for this purpose to use a constructed or estimated relative impedance curve like that shown at 510. The relative impedance trace shown at 510 is a low-cut filtered, velocity-multiplied-by-density curve to evaluate the relative impedance of the reservoir versus the encasing non-reservoir rocks from the well 500. In this example, the reservoir at zone 506 is relatively low-impedance. Therefore the processing renders as a distinct low-impedance voxel on In-line slice $I_0$ and Cross-line slice $C_0$. Both slices $I_0$ and $C_0$ contain the trace or column 512 seen in FIG. 5, with the wellpath intersecting near time $T_0$. If the impedance amplitude of the voxel at time $T_0$ is not negative, then the starting voxel must be moved up or down to the nearest low-impedance voxel. The detection procedure described below then determines if a correct choice of movement direction was made.

The cut-off or threshold parameters are the other important parameter for common-impedance object detection within a seismic time cube with the present invention. These parameters are selected during step 116.

Figure 6:
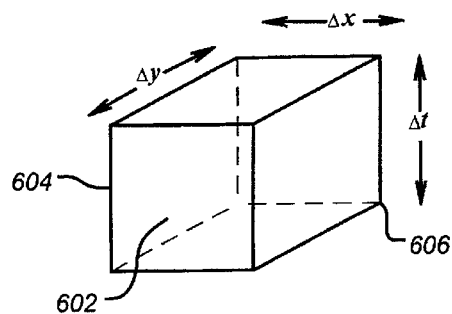

The significance of the cut-off parameters chosen can best be understood by reference to FIG. 6. After the starting voxel has been selected during step 114, the amplitude of each voxel in the time cube is initialized to make it begin the detection process as a background voxel.

The detection process of step 118 then begins. It is performed comparing the impedance amplitude A (e.g., an 8 bit integer with $-128 < A < +128$) of the starting voxel to the impedance amplitude of each of the adjacent voxels. Because every voxel has six faces 602, twelve edges 604, and eight corners 606, there are twenty-six voxels whose amplitudes must satisfy the chosen logic.

When looking for a low impedance subsurface feature, it is typical to use an amplitude selection logic that the amplitude voxel in question be less than or equal to that of the starting voxel. If an adjacent voxel's amplitude satisfies the cut-off criteria, it is flagged as having an acceptable amplitude and treated as an annexed voxel. The amplitude of each of the twenty-six voxels contiguous to the starting voxel are subjected to the amplitude comparison logic in this manner.

Those having amplitude satisfying the cut-off criteria or logic are annexed, in effect specifying a three-dimensional object of common impedance within the selection logic criteria. The annexed voxels when added to the starting voxel form the first generation of a common-impedance object. This foregoing process is repeated for each annexed voxel, causing the object to grow by linking to it each adjacent voxel that satisfies the cut-off criteria.

Subsequently, each of these newly annexed voxels thus becomes a second generation starting voxel and the detection process begins again for each such new starting voxel, flagging the new adjacent voxels (to the ones already annexed) as voxels that satisfy the cut-off criteria. This cycle of detection-and-annexation growth proceeds until a derision step 120 determines that either:

(1) The detection process is manually halted, usually after an unusually long detection time has passed, and either a new starting or new cut-off criteria (or both) are warranted and selected during steps 122 and 124, respectively; or (2) The common impedance object formed by a normal completion is surrounded by voxels whose impedance amplitudes violate the cut-off criteria (e.g., too high), or the edge of the impedance time cube is reached.

If normal completion is detected during step 120, control transfers to step 126 for a determination of the acceptability of the object so formulated at that time. If the object is unacceptable, control transfers to step 122 for continuance of the processing described above. If the object is deemed acceptable during step 126, control transfers to decision step 128. If additional starting voxels are required, control transfers from step 128 back to step 114 for continuance of the sequence described. If no new starting voxels are required, control is transferred to step 130. During step 130, the image, configuration, position, orientation, spatial characteristics and impedance distribution of the object are recorded and stored in tables, still images and 3D animations. The process is then complete.

A collection of voxels so formed does not actually have a common identical impedance value to those adjacent. Rather, the voxels found acceptable to define and make up a common-impedance object do satisfy a common set of cut-off criteria. The opacity of each voxel can then be displayed on currently available visualization software as a function of the voxel impedance amplitude. On some such systems, a user can independently control two separate opacity functions, one to control the capacity of the background voxels, and another to control the opacity of the annexed common-impedance object voxels.

Example Volumetric Models

Figure 7A:
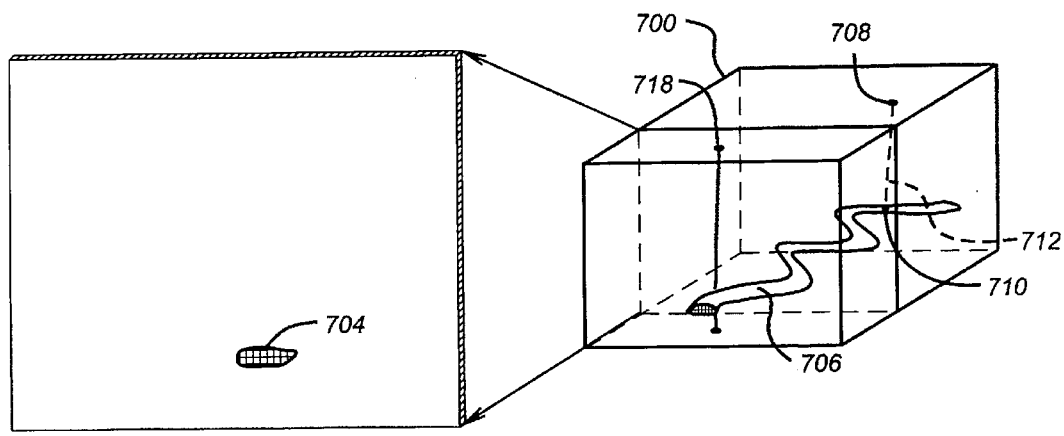
Figure 7B:
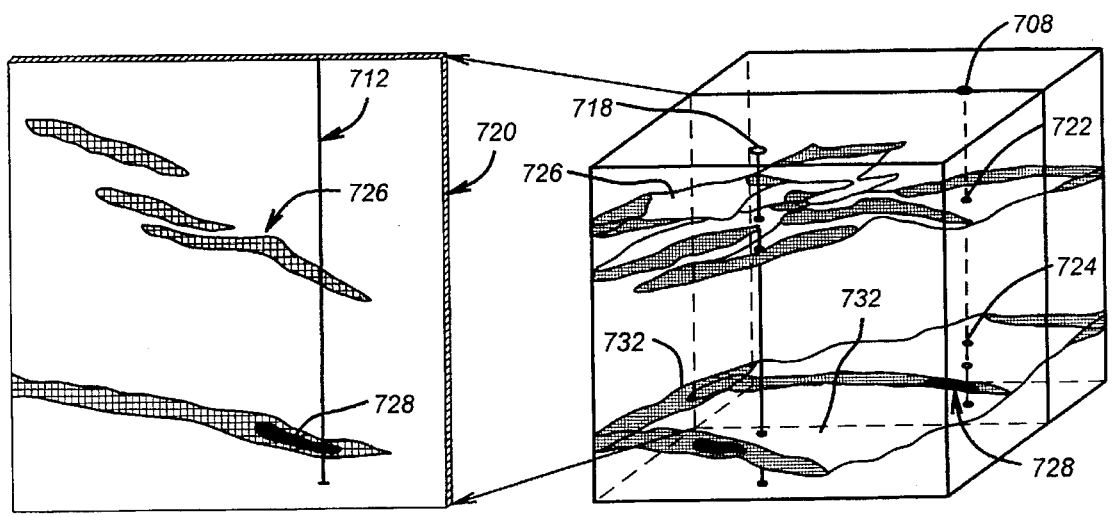

FIGS. 7A and 7B show examples of some acceptable and some unacceptable common impedance objects that can be formed on a workstation according to processing steps of the present invention described above. The displays so formed are indicative of the relative presence of subsurface objects or features of interest. The displays may be viewed on an electronic video monitor or they may be in printed form. They were formed when seeking, for example, a low impedance channel sandstone reservoir buried in a well-processed seismic impedance time cube.

FIG. 7A depicts at 702 an east-west constant-Y slice, one voxel thick, pulled out of seismic impedance time cube 700. The opaque object sliced at 704 is one of a series defining an acceptable channel sand, opaque common-impedance object which is fully annexed and displayed at 706. A borehole path 712 from producing Well #1 at 708 is shown imbedded in the transparent three-dimensional time cube. A starting voxel 710 was selected very near the almost vertical wellpath 712, in a low impedance zone near a two-way time related to the producing depth of the productive well perforations. The slice at 702 exhibits the cross-section of a fully annexed common-impedance object as an irregular ellipse 704, showing the shape of the low impedance reservoir in this vertical plane.

It is to be noted that the starting voxel 710 in the producing wellbore 708 is not necessarily the lowest impedance voxel in the object 706, nor is it necessarily in the thickest part of the reservoir. In fact, well site 708 was selected based on traditional mapping methods. It was fortunate to hit the reservoir 706 at all, and appears unlikely to have penetrated the reservoir at an optimum take point. Another Abandoned Well #2 at 718 was an earlier attempt to hit the sinuous channel 706. If migration-distorting velocity gradients are not severe, the display of FIG. 7A, especially when rotated in the display station and viewed at different angles to evaluate the shape of the object, should be of great value in choosing future development well sites. The reservoir object 706 detected according to the present invention is an acceptable one because well log data indicates this sand body to be a channel sandstone, and the shape of object 706 definitely appears to be a meandering channel.

FIG. 7B shows a slice at 720 pulled out of an unacceptably annexed time cube. In this case two different starting voxels at 722 and 724 were initiated. Starting voxel 722 and its cut-off criteria are seen to be unacceptable because they have resulted in a large volume object 726 that, after a number of adjustments both to the exact placement of the voxel 722 and to the value of the cut-off parameters, does not look like the postulated channel sand reservoir. It is concluded that the velocity function is not valid for this wellpath and that the resulting object 726 displayed probably represents multiple low-impedance shales.

Starting voxel 724 appears to be acceptable, but its cut-off criteria are too lax. The desired channel sand object 728 can be seen as a lower impedance area on the cross-section 720 that passes through the well path 712 of producing Well #1 708 (shown also in FIG. 7A) imbedded in a larger low-impedance layer 732. Because Abandoned Well #2 shown at 718 penetrated the postulated wide spread object 732 and found a wet sandstone, it can be concluded that the highest cut-off parameter needs to be lower in order to locate an acceptable channel sand petroleum-filled reservoir. Depending on the characteristics of the common-impedance objects under investigation, there are many possible variations on the above procedure for obtaining acceptable ones.

Summary

As has been set forth, the process acquires a three-dimensional reflection seismic data volume. The acquired seismic data are then computer processed to produce a well-processed volume of seismic reflectivity samples. This processing is typically guided by well log data. The volume of seismic reflectivity samples is then converted into a volume of "relative logarithm of the average acoustic impedance" samples.

The assembled data and impedance samples are then furnished as a volume visualization computer database project, furnished as input data to a high-speed volume-rendering workstation. Each seismic impedance sample is treated as a voxel, or individual volume element, with a calculable estimated volume. A specific starting point is then selected in the database to act as a starting point for an iterative detection or comparison process, which leads to a detected common-impedance object or feature of interest. A resulting feature of interest so formed includes a number of contiguous individual voxels that have impedance amplitude values within a given range of acceptable parameters.

Initially, contiguous voxels are analyzed to decide if any of the adjacent voxels should be regarded as part of the object. If so, they are added or assembled into a common-impedance object with acceptable parameter characteristics. If not, the element is rejected. The detection process continues for individual elements adjacent to those assembled during a comparison cycle and is repeated until detection parameters result in a resultant common-impedance object composed of volume elements of commonly acceptable parameters.

Quantitative measures can then be made of the spatial position, orientation, shape or configuration, volumetric dimensions, and relative acoustic impedance distribution of the features so located. The quantitative position, orientation, shape and configuration of the detected model are then stored. If desired, the parameters may be adjusted and the process repeated. An output display of the assembled common-impedance objects are thereafter available for being formed on a data display at the workstation as an image of the subsurface feature of interest.

Having described the invention above, various modifications of the techniques, procedures, material and equipment will be apparent to those in the art. It is intended that all such variations within the scope and spirit of the appended claims be embraced thereby.

I claim:

1. A method of forming an image of a subsurface earth feature of interest based on geophysical measurements, comprising the steps of:

obtaining signals representative of a subsurface area of interest in the earth;

dividing the subsurface area of interest into a number of individual volume elements;

forming a measure of the acoustic impedance of the individual volume elements;

comparing the acoustic impedance of the individual volume elements with a reference level;

assembling as a volumetric model these individual volume elements having an acceptable acoustic impedance as a result of said step of comparing; and forming an output display of the assembled volumetric model as an image of the subsurface feature of interest.

2. The method of claim 1, wherein said step of forming a measure of the impedance includes the step of:

obtaining a measure of the velocity of sound through the volume elements;

obtaining a measure of the density of the volume element; and combining the velocity and density measures to form a measure of acoustic reflectivity by the volume element.

3. The method of claim 2, wherein said step of obtaining signals comprises the step of:

obtaining seismic signals representative of a subsurface area of interest in the earth.

4. The method of claim 3, wherein said step of obtaining a measure of the velocity includes the step of:

processing the obtained seismic signals to obtain a measure of the velocity of sound through the volume elements.

5. The method of claim 2, wherein said step of obtaining signals comprises the step of:

obtaining velocity log signals representative of a subsurface area of interest in the earth.

6. The method of claim 5, wherein said step of obtaining a measure of the velocity includes the step of:

processing the obtained velocity log signals to obtain a measure of the velocity of sound through the volume elements.

7. The method of claim 3, wherein said step of obtaining a measure of the velocity includes the step of:

obtaining density log signals representative of a subsurface area of interest in the earth.

8. The method of claim 7, wherein said step of obtaining a measure of the velocity includes the step of:

processing the obtained density log signals to obtain a measure of the density of the volume elements.

9. The method of claim 1, wherein said step of forming a measure of impedance includes the step of:

forming a measure $I_i$ of the acoustic impedance I of the ith volume element.

10. The method of claim 9, wherein said step of forming a measure of acoustic impedance I of the ith volume element includes the step of:

forming a measure of the reflectivity $R_i$ of the ith volume element.

11. The method of claim 10, wherein said step of forming a measure of the acoustic impedance I is performed by forming a sum of the measures of reflectivity $R_i$.

12. The method of claim 1, wherein said step of comparing includes the step of:

selecting those individual volume elements having acceptable acoustic impedance.

13. The method of claim 1, wherein said step of comparing includes the step of:

rejecting those individual volume elements having unacceptable acoustic impedance.

14. The method of claim 13, wherein said step of comparing includes the step of:

beginning the comparison process at a starting point individual volume element in the area of interest having a formed measure of acoustic impedance;

comparing the acoustic impedance of those volume elements adjacent the starting point individual volume element.

15. The method of claim 14, wherein said step of comparing further includes the step of:

selecting those adjacent individual volume elements having acceptable acoustic impedance.

16. The method of claim 15, wherein said step of assembling comprises the step of:

comparing the acoustic impedance of volume elements adjacent those selected with a reference level.

* * * * *